(12) United States Patent
Masui

(10) Patent No.: US 6,353,442 B1
(45) Date of Patent: Mar. 5, 2002

(54) INFORMATION PROCESSING APPARATUS, INFORMATION PROCESSING METHOD, AND PROVIDING MEDIUM

(75) Inventor: Toshiyuki Masui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/418,050

(22) Filed: Oct. 14, 1999

(30) Foreign Application Priority Data

Oct. 20, 1998 (JP) .............................. 10-298409

(51) Int. Cl.$^7$ ................................ G09G 5/34
(52) U.S. Cl. ........................ 345/684; 345/685
(58) Field of Search ................. 345/123, 124, 345/125, 127, 146, 357, 684, 685, 686, 687

(56) References Cited

U.S. PATENT DOCUMENTS 5,990,890 A * 11/1999 Etheredge .................. 345/347
6,100,889 A *  8/2000 Sciammarella et al. ..... 345/353

* cited by examiner

*Primary Examiner*—Matthew Luu
(74) *Attorney, Agent, or Firm*—Bell, Boyd & Lloyd LLC

(57) ABSTRACT

In an information processing apparatus, items to be displayed are easily controlled. A user operates a mouse to select an English word displayed in a scroll window with a pointer, and drags the selected word. Thus, English words to be displayed in the scroll window are restricted.

3 Claims, 37 Drawing Sheets

FIG. 5

| REGISTERED NUMBER | ENGLISH WORD | DOI VALUE |
|---|---|---|
| 993 | granule | 0 |
| 994 | grape | 1 |
| 995 | grapefruit | 0 |
| 996 | grapevine | 2 |
| 997 | graph | 0 |
| 998 | graphic | 1 |
| 999 | graphically | 0 |
| 1000 | graphics | 100 |
| 1001 | graphite | 0 |
| 1002 | graph paper | 1 |

FIG. 10

| DOI VALUE | ITEMS TO BE DISPLAYED |
|---|---|
| 0 | granule |
| 1 | grape |
| 0 | grapefruit |
| 2 | grapevine |
| 0 | graph |
| 1 | graphic |
| 0 | graphically |
| 100 | graphics |
| 0 | graphita |
| 1 | graph paper |

FIG. 11

| DOI VALUE | ITEMS TO BE DISPLAYED |
|---|---|
| 1 | grape |
| 2 | grapevine |
| 1 | graphic |
| 100 | graphics |
| 1 | graph paper |

FIG. 28

| DOI VALUE | ENTRY |
|---|---|
| 0 | displine () |
| 0 | { |
| -1 |     if(displayp) { |
|  |     . . . |
| 0 |     } |
| 0 | lbmouse(LensBar *lb) |
| 0 | { |
| 5 |     long mousex, mousey |
| -1 |     long origx, origy |
|  |     . . . |
| 5 |     mousex=getvaluator(MOUSEX) ; |
| 5 |     startx=X=mousex-origx ; |
|  |     . . . |
| 3 |         mousex=getvaluator(MOUSEX) ; |
|  |     . . . |
| 2 |             mousex=getvaluator(MOUSEX) ; |
| -4 |             display () ; |
| -1 |     } |
| 0 | } |

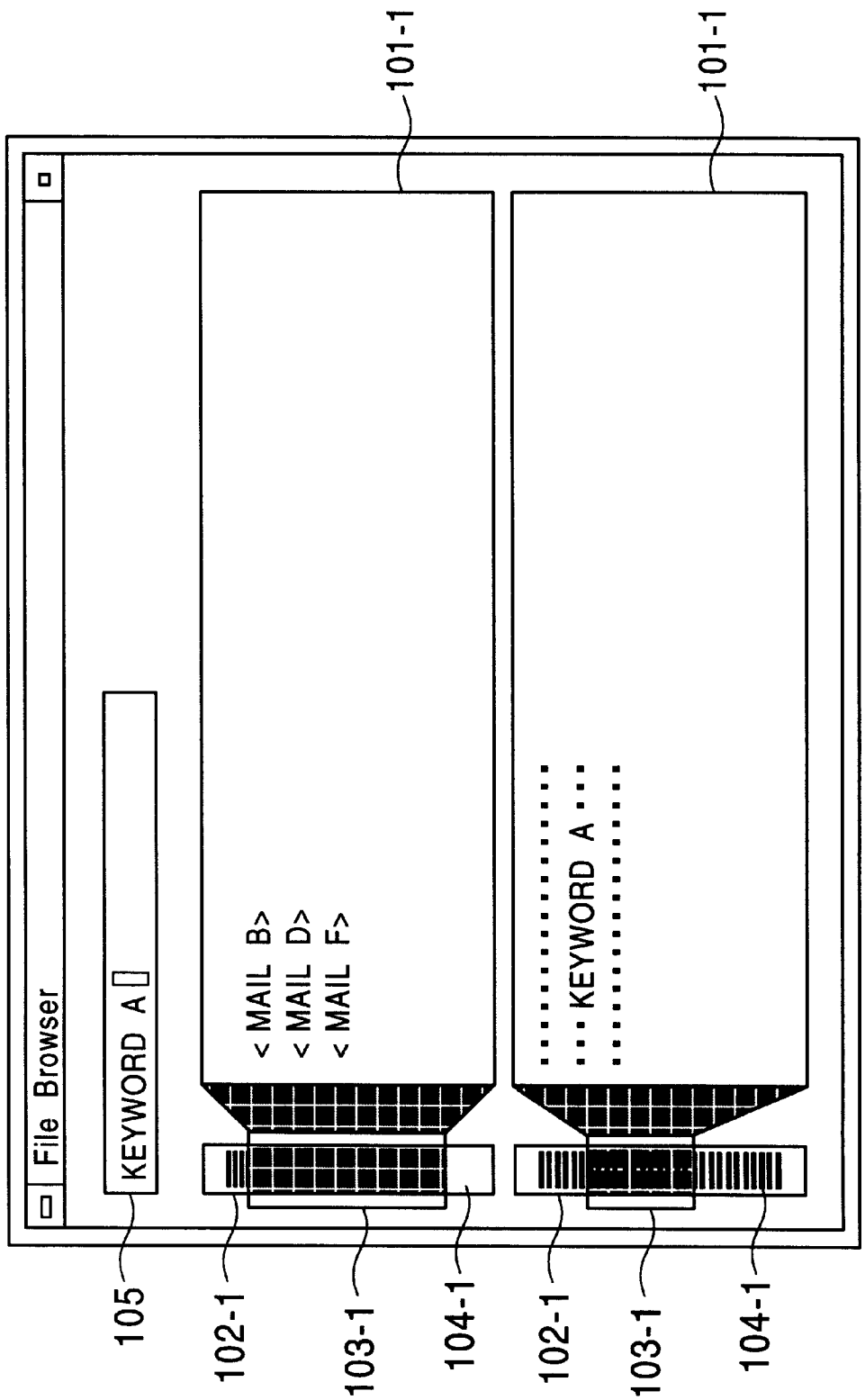

INFORMATION PROCESSING APPARATUS, INFORMATION PROCESSING METHOD, AND PROVIDING MEDIUM

BACKGROUND OF THE INVENTION

1. Field of the Invention

The present invention relates to information processing apparatuses, information processing methods, and providing media. More particularly, the invention relates to an information processing apparatus that restricts information to be displayed. The invention also pertains to an information processing method for use in the above type of apparatus and to a providing medium implementing this method.

2. Description of the Related Art

In retrieving desired information from predetermined information stored in, for example, a hard disk, by utilizing a personal computer, a user generally displays the information on a display unit while scrolling the information and then checking the information. Alternatively, the user displays only information matching a keyword on the display unit and then checks the information.

According to conventional methods, however, it is difficult to retrieve information from a large amount of information.

SUMMARY OF THE INVENTION

Accordingly, in view of the above background, it is an object of the present invention to easily retrieve information by restricting the amount of information to be displayed.

In order to achieve the above object, according to one aspect of the present invention, there is provided an information processing apparatus for extracting a predetermined item from a plurality of items having predetermined registered numbers and for displaying the extracted item. The information processing apparatus includes a degree-of-interest (DOI) value setting unit for setting a DOI value for the item based on the registered number of the item. A threshold setting unit sets a threshold for identifying the DOI value set by the DOI value setting unit. An identifying unit identifies the DOI value set by the DOI value setting unit in accordance with the threshold set by the threshold setting unit. A first display control unit controls the item to be displayed based on a result obtained by the identifying unit. A second display control unit controls the item to be displayed according to the DOI value based on the result obtained by the identifying unit.

According to another aspect of the present invention, there is provided an information processing method for extracting a predetermined item from a plurality of items having predetermined registered numbers and for displaying the extracted item. The information processing method includes a DOI value setting step of setting a DOI value for the item based on the registered number of the item, a threshold setting step of setting a threshold for identifying the DOI value set in the DOI value setting step, an identifying step of identifying the DOI value set in the DOI value setting step in accordance with the threshold set in the threshold setting step, a first display control step of controlling the item to be displayed based on a result obtained in the identifying step, and a second display control step of controlling the item to be displayed according to the DOI value based on the result obtained in the identifying step.

According to a further aspect of the present invention, there is provided a providing medium for providing a computer-readable program that causes an information processing apparatus for extracting a predetermined item from a plurality of items having predetermined registered numbers and for displaying the extracted item to execute processing. The processing includes a DOI value setting step of setting a DOI value for the item based on the registered number of the item, a threshold setting step of setting a threshold for identifying the DOI value set in the DOI value setting step, an identifying step of identifying the DOI value set in the DOI value setting step in accordance with the threshold set in the threshold setting step, a first display control step of controlling the item to be displayed based on a result obtained in the identifying step, and a second display control step of controlling the item to be displayed according to the DOI value based on the result obtained in the identifying step.

BRIEF DESCRIPTION OF THE DRAWINGS

FIG. 5 illustrates a degree-of-interest (DOI) value;

FIG. 10 illustrates the DOI value;

FIG. 11 illustrates the DOI value;

FIG. 28 illustrates the DOI value;

FIG. 38 illustrates another example of the search screen displayed on the display unit 16 shown in FIG. 36.

DESCRIPTION OF THE PREFERRED EMBODIMENTS

Figure 1:
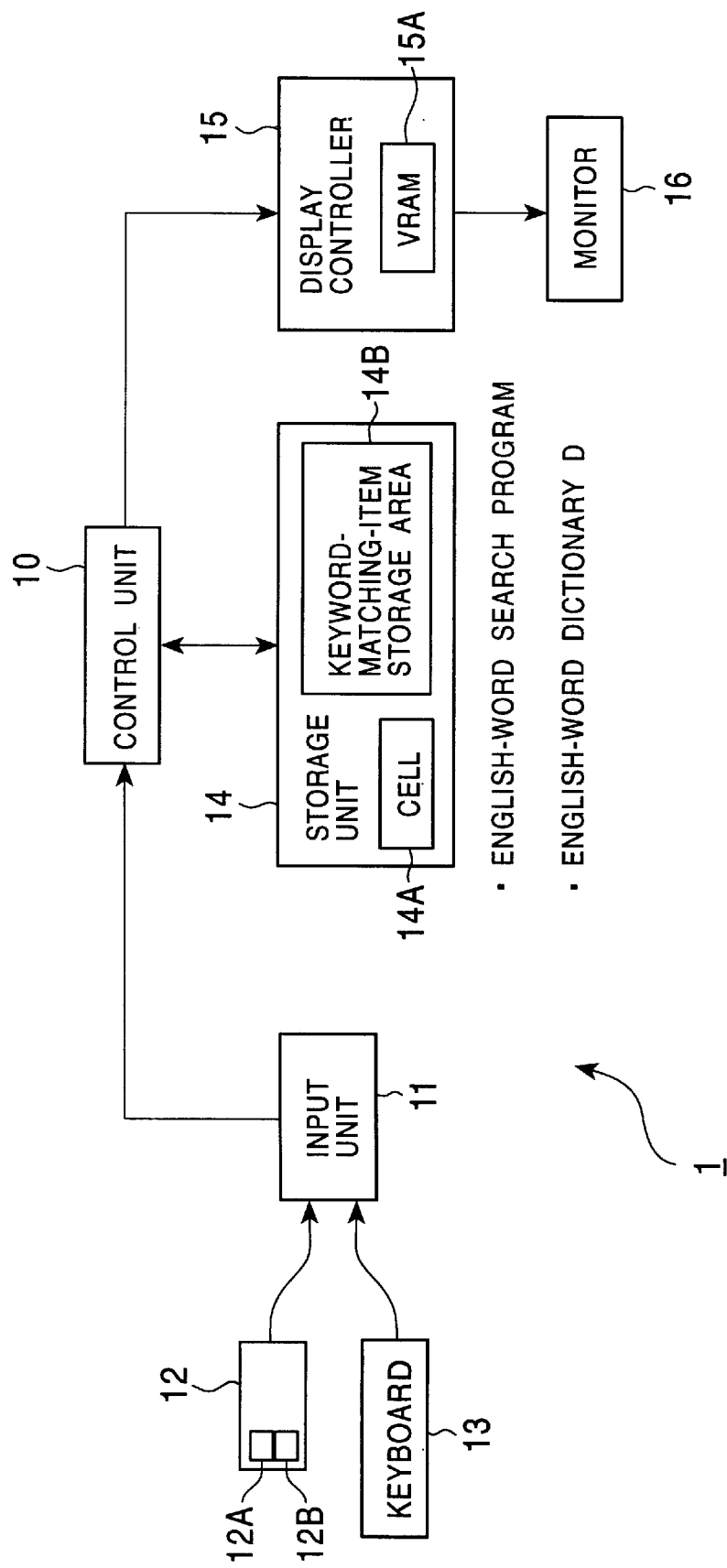
FIG. 1 is a block diagram illustrating a personal computer 1 incorporating a first embodiment of the present invention.

Referring to the block diagram illustrating a personal computer 1 incorporating a first embodiment of the present invention shown in FIG. 1, an input unit 11 is connected to a mouse 12 and a keyboard 13 and supplies a signal transmitted from the mouse 12 or the keyboard 13 through the operation of a user to a control unit 10. The mouse 12 has an on-button 12A and an off-button 12B. In this embodiment, the mouse 12 is used as a pointing device, and the keyboard 13 is used as a character input device. However, the mouse 12 and the keyboard 13 are only examples. As the pointing device, a pen, a jog-dial, or a gyroscopic device, such as a gyro mouse, may be used. As the character input device, an input device having a limited number of keys, such as a mobile telephone, or a handwritten-character recognition device may be used.

A storage unit 14 stores an English-word search program provided with a browsing function, which is activated corresponding to a scrolling operation, and a display-item control function (both functions will be discussed later). The storage unit 14 also stores an English-word dictionary D used for the English-word search program. In the English-word dictionary D, a plurality of English words are registered in accordance with registered numbers, which are set according to alphabetical order. The storage unit 14 integrates a cell 14A for storing the registered number of a predetermined English word and a keyword-matching-item storage area 14B.

A display controller 15 draws data supplied from the control unit 10 into a built-in video random access memory (VRAM) 15A, and displays the drawn image data on a monitor 16. The control unit 10 executes various processing according to the signals transmitted from the input unit 11.

In the personal computer 1 constructed as described above, in response to an operation performed on the mouse 12 or the keyboard 13 by the user, a signal instructing the start of the English-word search program is supplied from the input unit 11 to the control unit 10. The control unit 10 then starts the English-word search program stored in the storage unit 14 and controls the display controller 15 to display a search screen (initial screen) of the English-word search program, such as the one shown in FIG. 2. In this example, at the right side of the screen, a scroll window 101 is shown, and at the left side of the screen, a scroll bar 102 and a knob 103 are indicated. Within the scroll bar 102, a position-bar indicator 104 is shown. An input section 105 is indicated at the top of the screen.

The above-described elements shown on the search screen are now described in detail. Within the scroll window 101, words selected from the English words registered in the English-word dictionary D stored in the storage unit 14 are indicated according to the display-item control processing, which will be discussed later. The English words selected by the display-item control processing will be hereinafter referred to as "items to be displayed (target items)".

The user operates the mouse 12 to move a pointer to a desired word selected from the English words indicated on the scroll window 101, and then operates the on-button 12A, thereby selecting the desired word. Subsequently, the user executes predetermined processing so as to obtain information concerning the selected word. In this case, in the initial state, the word "graphics", is automatically selected, on which a selector is positioned.

Inside the position-bar indicator 104 formed within the scroll bar 102, position bars P (FIG. 16) indicating the positions of the words in the English-word dictionary D displayed in the scroll window 101 are shown.

The position bar P is discussed below with reference to FIG. 16, though a detailed description will be given later. In the example illustrated in FIG. 16, eight words are selected from the English words registered in the English-word dictionary D as items to be displayed, and eight position bars P-1 through P-8 (hereinafter simply referred to the "position bars P" when the position bars P-1 through P-8 are not required to be individually distinguished) corresponding to the selected eight words are displayed in the position-bar indicator 104. For example, six position bars P-1 through P-6 correspond to six English words, i.e., carp, ditch, graphics, legation, overrate, and revel, respectively, shown in the scroll window 101, the position bars P-1 through P-6 being displayed in alphabetical order (in the order of the registered numbers) in the English-word dictionary D.

For example, the position bar P-1 corresponding to "carp" starting with "c" is shown at the upper side of the position-bar indicator 104 and is higher than the position bar P-2 corresponding to "ditch" beginning with "d". The position bar P-6 corresponding to "revel" starting with "r" is shown at the lower side of the position-bar indicator 104 and is lower than the position bar P-5 corresponding to "overrate beginning with "o".

In this manner, the position bars P are displayed in the position-bar indicator 104 in such a manner that they designate the positions of words to be displayed in the English-word dictionary D. This enables the user to recognize the position in the English-word dictionary D, which serves as an information source, at which the item indicated in the scroll window 101 is located.

In the initial state, all of the words registered in the English-word dictionary D are to be displayed. Accordingly, the position bars P corresponding to all the words are densely displayed, as represented by a vertically extending rectangle shown in FIG. 2.

The knob 103 is shifted up and down on the scroll bar 102 by operating the mouse 12. A line L displayed at the central position of the knob 103 is located on predetermined position bars P, which can thus be specified. The items corresponding to the specified position bars P are indicated in the scroll window 101.

Figure 16:
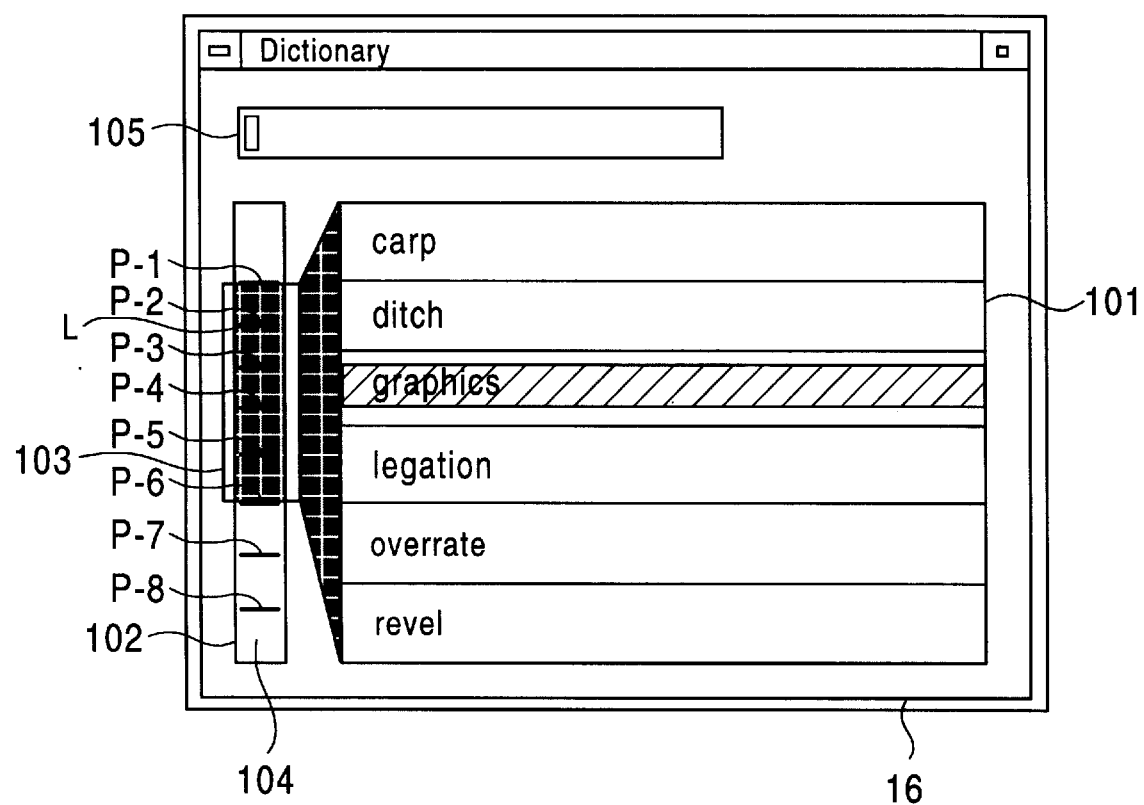
FIG. 16 illustrates a further example of the search screen displayed on the display unit 16 shown in FIG. 1.

In the example illustrated in FIG. 16, the position of the knob 103 is set so that the line L is displayed on the position bars P-1 through P-6. Thus, the position bars P-1 through P-6 are specified by the line L, and the words corresponding to the position bars P-1 through P-6 are indicated in the scroll window 101.

The vertical dimension of the knob 103 and that of the line L are automatically increased or decreased according to the position on the position-bar indicator 104 at which the position bars P are displayed and to the number of items to be displayed in the scroll window 101, i.e., the number of the specified position bars P. In the example shown in FIG. 16, the position bars P-1 through P-8 are spread out in the position-bar indicator 104, and thus, the lengths of the knob 103 and the line L are greater (the two vertical dimensions are almost the same) than those of the example shown in FIG. 2.

Figure 2:
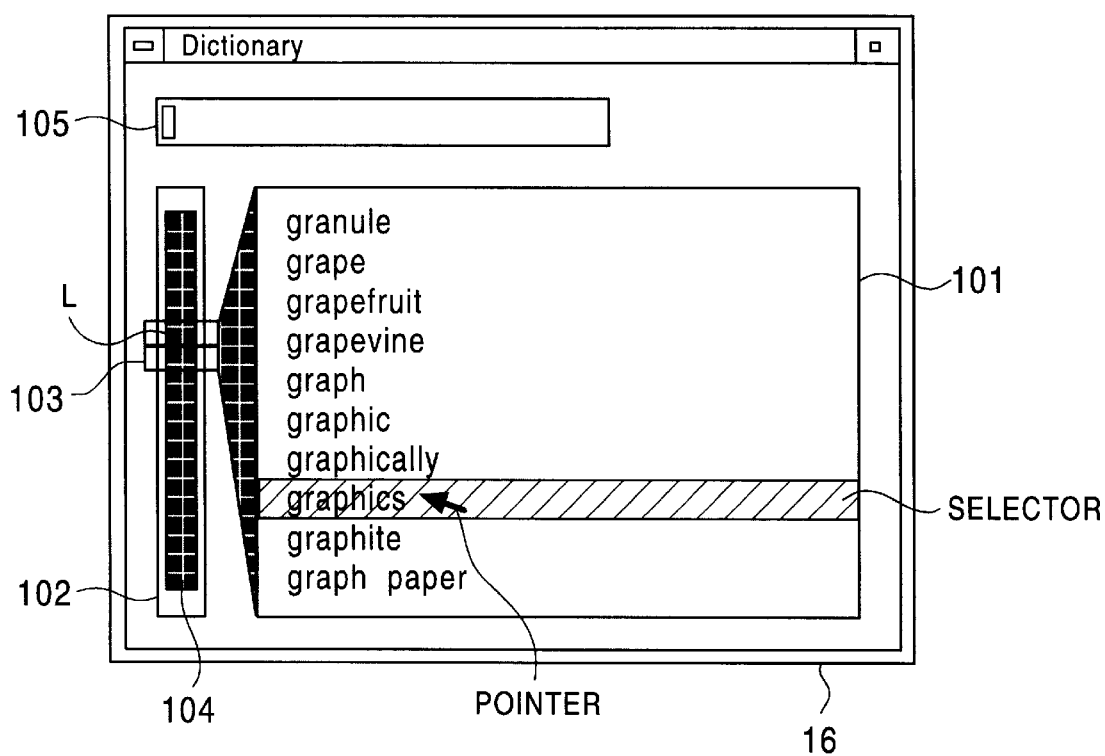
FIG. 2 illustrates an example of a search screen displayed on a display unit 16 shown in FIG. 1.

In the example illustrated in FIG. 2, since the position bars P are densely displayed on the position-bar indicator 104, the vertical dimensions of the knob 103 and the line L are not increased. In this case, a plurality of position bars P corresponding to the English words starting with "g" are designated by the line L, and such words are indicated in the scroll window 101.

In this manner, target items corresponding to the position bars P designated by the line L (knob 103) are indicated in the scroll window 101. Accordingly, the user is able to shift the position of the knob 103 by operating the mouse 12, thereby switching items to be displayed, i.e., scrolling target items.

Figure 3:
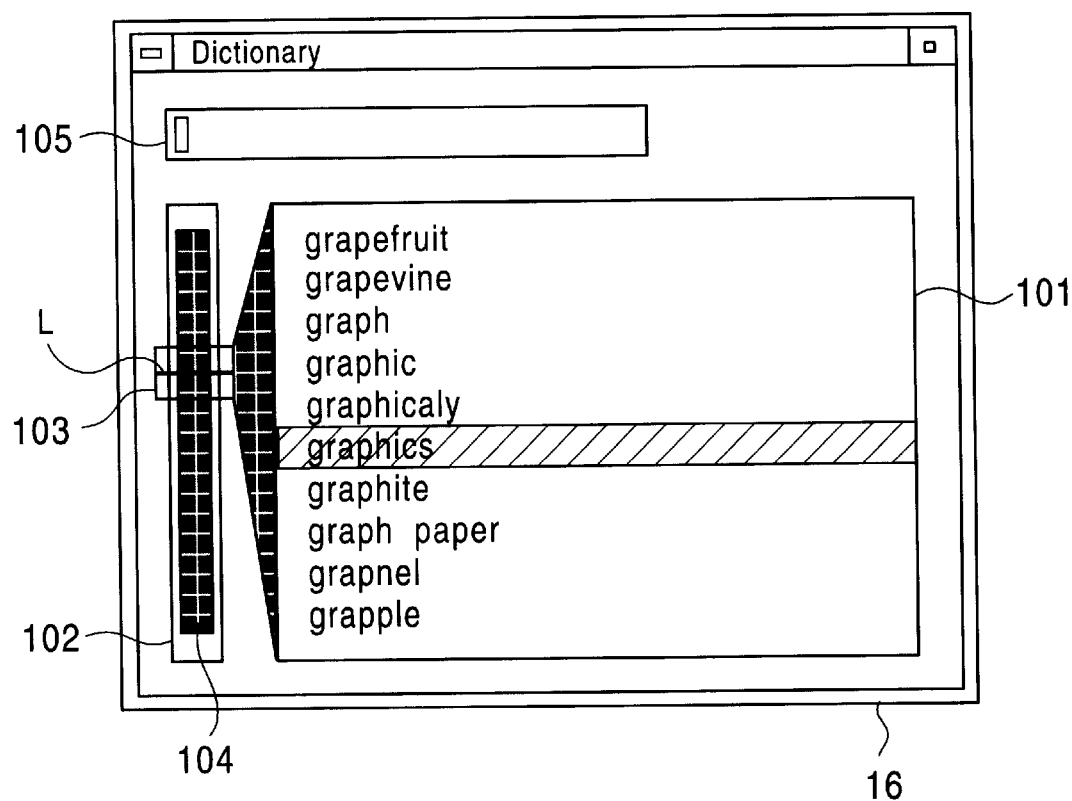
FIG. 3 illustrates another example of the search screen displayed on a display unit 16 shown in FIG. 1.

FIG. 3 illustrates the search screen on which the knob 103 has been moved downward from the position shown in FIG. 2. In FIG. 3, English words arranged alphabetically after those shown in FIG. 2 are indicated in the scroll window 101.

In shifting the position of the knob 103 on the scroll bar 102, the user operates the mouse 12 to move the pointer to the knob 103. Then, the user operates the on-button 12A to move (drag) the pointer upward or downward, thereby moving the knob 103.

Alternatively, the user may operate the mouse 12 to move the pointer to a portion outside the knob 103 on the scroll bar 102 (including the position-bar indicator 104). Then, the user may operate the on-button 12A (click the above-mentioned portion outside the knob 103), thereby moving the knob 103. The above-mentioned clicking operation moves the knob 103 in a more stepwise manner rather than the dragging operation previously discussed. That is, the display content of the scroll window 101 can be scrolled in a more stepwise manner.

As discussed above, the position bars P are displayed so as to represent the positions in the information source, i.e., in English-word dictionary D, at which the items to be displayed are located, and the target items corresponding to the designated position bars P are displayed in the scroll window 101. This enables the user to easily find and display a desired item. That is, the user is able to browse information more efficiently.

The processing for displaying the scroll window 101 of the search screen shown in FIG. 2 on the monitor 16 by the control unit 10 is now described with reference to the flow chart of FIG. 4.

The control unit 10 first starts the English-word search program stored in the storage unit 14. Then, in step S1, the control unit 10 detects the number N of English words registered in the English-word dictionary D. In step S2, the control unit 10 stores the registered number of the predetermined word in the cell 14A of the storage unit 14. In this example, the registered number of the word "graphics" is stored in the cell 14A, and in this case, the registered number of "graphics", i.e., 1000, as shown in FIG. 5, is stored in the cell 14A.

In step S3, the control unit 10 sets the degree of interest (hereinafter referred to as the "DOI value") for each of the words registered in the English-word dictionary D. The processing for setting the DOI value in step S3 is discussed in detail below with reference to the flow chart of FIG. 6.

In step S11, the control unit 10 sets a counter i for counting the number of registered numbers of English words to be 1 (initial value).

Subsequently, in step S12, the control unit 10 determines the absolute value obtained by subtracting the value stored in the cell 14A (the registered number of "graphics") from the value set in the counter i. It is then determined in step S13 whether the absolute value is 0, i.e., whether the value set in the counter i is equal to the value stored in the cell 14A. If the outcome of step S13 is no, the process proceeds to step S14.

In step S14, the control unit 10 converts the absolute value obtained in step S12 into a binary number, and then detects the consecutive number of zeros starting from the unit digit. In step S15, the number of zeros is then set to be the DOI value of the word having the registered number corresponding to the counter i.

For example, it is now assumed that the counter i is incremented by the processing of step S17, which will be mentioned below, so that the registered number 996 "grapevine" (FIG. 5) is set in the counter i. In step S12, 4 (=1000−996) is obtained, and in step S14, 4 is converted into a binary number 100. Since there are two consecutive zeros, the DOI value of "grapevine" having the registered number 996 is set to be 2 in step S15.

If the binary number is, for example, 11 or 101, there are no consecutive zeros starting from the unit digit, and thus, the DOI value is set to be 0.

The control unit 10 then determines in step S16 whether the counter i is equal to the number N of English words registered in the English-word dictionary D, i.e., whether i=N. If the result of step S16 is no, i.e., if there is any word left in which the DOI value has not yet set, the process proceeds to step S17 in which the counter i is incremented by one. The process then returns to step S12, and the DOI value of the word having the subsequent registered number is determined and set.

If it is found in step S13 that the counter i is equal to the value stored in the cell 14A (the absolute value obtained in step S12 is 0), i.e., if the registered number of "graphics" 1000 is set in the counter i, the process proceeds to step S18 in which a large number, for example, 100, is set to be the DOI value of "graphics" (the word having the registered number which is the same value stored in the counter i). The process then returns to step S16.

If it is found in step S16 that the counter i is equal to the number N of words registered in the English-word dictionary D (i.e., i=N), the DOI values have been set in all the words registered in the English-word dictionary D, as indicated by the table shown in FIG. 5. In FIG. 5, the registered numbers of the words indicated in the scroll window 101 of the search screen illustrated in FIG. 2 are shown, and the DOI values of the individual words when "graphics" is selected are also shown.

Figure 4:
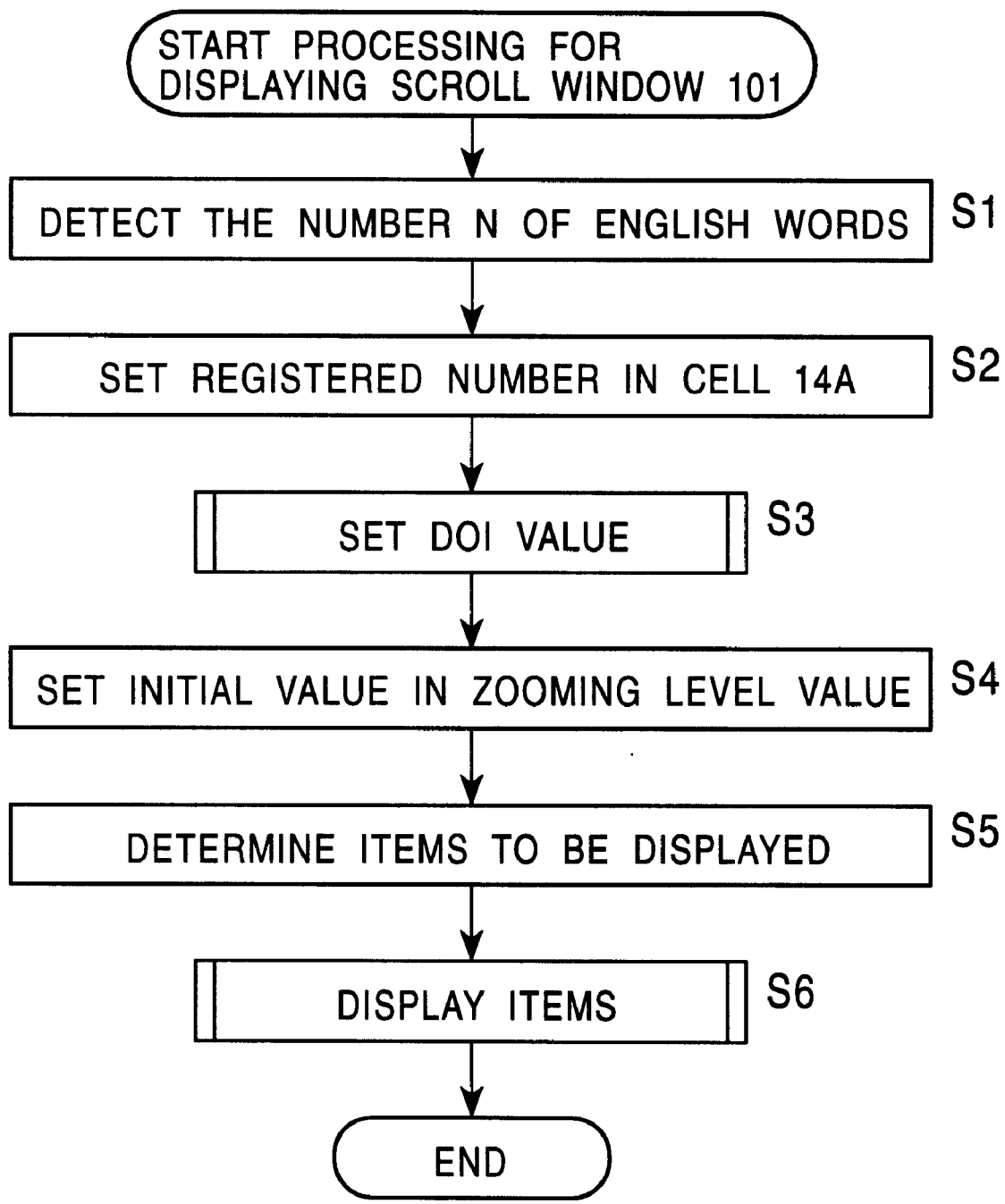
FIG. 4 is a flow chart illustrating the processing for displaying a scroll window 101.

Upon completion of the processing for setting the DOI values, the process returns to step S4 of FIG. 4. In step S4, the control unit 10 sets an initial value in a predetermined threshold (hereinafter referred to as the "zooming level value"). In step S5, the control unit 10 extracts the words having DOI values greater than the zooming level value and determines them to be items to be displayed. In this example, the zooming level value is initialized to be 0.

Figure 7:
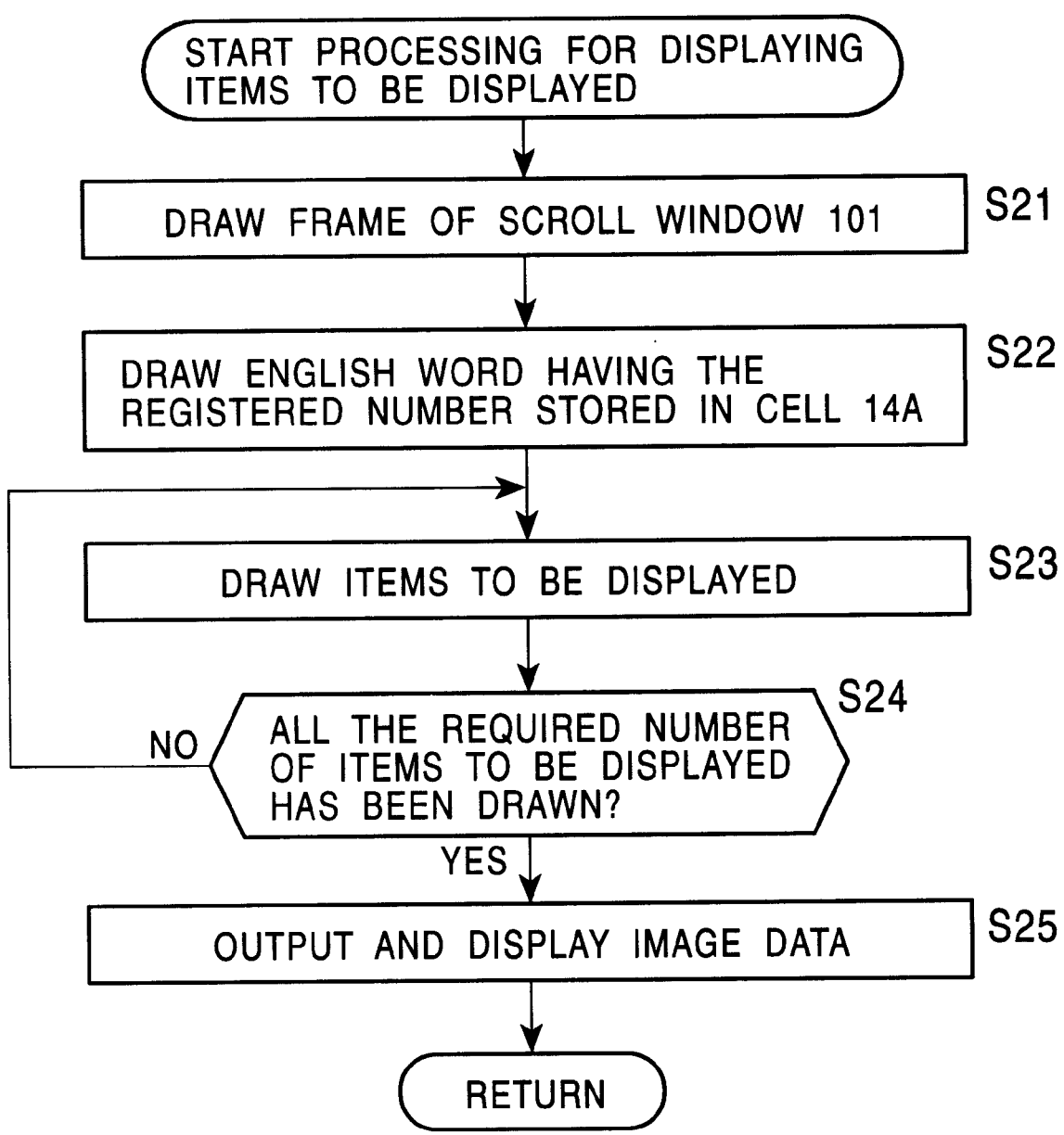
FIG. 7 is a flow chart illustrating the processing for displaying items to be displayed.

In step S6, the control unit 10 controls the display controller 15 to display predetermined words selected from the target items determined in step S5 on the monitor 16. The processing for displaying the target items in step S6 is described in detail below with reference to the flow chart of FIG. 7.

In step S21, the control unit 10 draws a frame, such as the scroll window 101 of the search screen shown in FIG. 2, in the VRAM 15A of the display controller 15. Subsequently, in step S22, the control unit 10 draws the word (item to be displayed) having the registered number stored in the cell 14A at a predetermined position of the frame drawn in the VRAM 15A in step S21. In this case, "graphics" is drawn at the predetermined position of the frame.

In step S23, the control unit 10 sequentially draws words starting from the word having the registered number closest to the registered number of the word drawn in step S22 (in alphabetical order or in the reverse order). The control unit 10 then makes a determination in step S24 of whether all of the words to be drawn in the frame (in this example, ten words) have been drawn. If the outcome of step S24 is no, the process returns to step S23, and the processing of step S23 is repeatedly executed. Accordingly, the words to be displayed in the scroll window 101 of the search screen shown in FIG. 2 are sequentially drawn.

If it is found in step S24 that all of the words have been drawn, the process proceeds to step S25. In step S25, the control unit 10 controls the display controller 15 to read the image data from the VRAM 15A and to display it on the monitor 16. As a result, the scroll window 101 of the search screen shown in FIG. 2 is displayed on the monitor 16. Upon completion of the processing for displaying the items to be displayed, the process returns to the flow chart of FIG. 4, and the display processing is completed.

The processing for scrolling the display content of the scroll window 101 by the control unit 10 is now discussed with reference to the flow chart of FIG. 8.

When the search screen illustrated in FIG. 2 is displayed on the monitor 16, the registered number 1000 of "graphics" is stored in the cell 14A of the storage unit 14, and the zooming level value is set to be 0. In this state, in step S31, the control unit 10 waits for the user to operate the on-button 12A of the mouse 12. When the on-button 12A is operated, the process proceeds to step S32 in which the coordinates $(x_0, y_0)$ designated by the pointer are detected.

The control unit 10 then determines in step S33 whether the position designated by the pointer (the coordinates $(x_0, y_0)$ detected in step S32) is on the scroll bar 102 (including the position-bar indicator 104). If the result of step S33 is no, the process returns to step S31 in which the control unit 10 waits for the user to operate the on-button 12A of the mouse 12.

If it is found in step S33 that the coordinates $(x_0, y_0)$ are located on the scroll bar 102, the process proceeds to step S34 in which the control unit 10 determines whether the coordinates $(x_0, y_0)$ are positioned on the knob 103. If the outcome of step S34 is yes, the process proceeds to step S35.

The control unit 10 determines in step S35 whether the off-button 12B of the mouse 12 has been operated. If the result of step S35 is no, the process proceeds to step S36 in which the coordinates $(x_1, y_1)$ designated by the pointer are detected.

Thereafter, in step S37, the control unit 10 detects the direction and the distance $(|y_0-y_1|)$ at which the pointer has traveled on the Y axis from the coordinates $(x_0, y_0)$ detected in step S32 and the coordinates $(x_1, y_1)$ detected in step S36. That is, the distance at which the knob 103 has been dragged on the Y axis is calculated, and the direction in which the knob 103 has been dragged is detected according to whether the calculated distance is a positive or negative value.

In step S38, the control unit 10 moves the knob 103 based on the direction and the distance on the Y axis detected in step S37. Then, the control unit 10 reads the words corresponding to the position bars P designated by the line L of the knob 103 from the English-word dictionary D, and displays them in the scroll window 101.

In this manner, the display content of the scroll window 101 is scrolled by performing the dragging operation using the mouse 12.

Subsequently, in step S39, the control unit 10 detects the selected word (on which the selector is positioned) and stores the registered number of the word in the cell 14A of the storage unit 14. When scrolling the display content within the currently displayed screen, such as when changing the scroll window 101 shown in FIG. 2 into the one shown in FIG. 3 by scrolling it, the word "graphics" selected by the selector is unchanged. However, when scrolling the scroll window 101 by more than one screen, the word selected by the selector is changed to another word. In this example, regardless of whether the selected word is changed or unchanged, the registered number previously stored in the cell 14A is overwritten by the registered number of the currently selected word.

Then, the process returns to step S35 in which the control unit 10 determines whether the off-button 12B of the mouse 12 has been operated. That is, the processing from steps S35 to S39 is repeated until the dragging operation on the knob 103 is released.

If it is found in step S35 that the off-button 12B of the mouse 12 has been operated, the process proceeds to step S40 in which the DOI value is set. In step S40, processing similar to that performed in step S3 of FIG. 4 (steps S11 through S18 of FIG. 6) is executed, and a detailed explanation will thus be omitted. Briefly, however, in step S40, the DOI value is calculated based on the value (registered number) currently stored in the cell 14A, and the calculated DOI value is set. The processing is then completed.

If it is found in step S34 that the coordinates $(x_0, y_0)$ are not located on the knob 103, i.e., that the coordinates $(x_0, y_0)$ are positioned on a portion of the scroll bar 102 outside the knob 103, the process proceeds to step S41. In step S41, the control unit 10 detects the coordinates $(x_1, y_1)$ specified by the pointer.

In step S42, the control unit 10 then detects the positional relationship between the knob 103 and the coordinates $(x_1, y_1)$, and in step S43, the control unit 10 moves the knob 103 to the location corresponding to the detected positional relationship. Thereafter, the control unit 10 reads the words corresponding to the position bars P designated by the line L of the knob 103 from the English-word dictionary D, and displays them in the scroll window 101.

In this manner, the display content of the scroll window 101 is scrolled by performing the clicking operation using the mouse 12.

Then, the process proceeds to step S40 in which the DOI value is set. The processing is thus completed.

The processing for controlling items to be displayed by the control unit 10 is now discussed with reference to the flow chart of FIG. 9. When the search screen shown in FIG. 2 is displayed on the monitor 16, the registered number 1000 of "graphics" is stored in the cell 14A, and the zooming level value is set to be 0. In this state, in step S51, the control unit 10 waits for the user to operate the on-button 12A of the mouse 12. If the on-button 12 A has been operated in step S51, the process proceeds to step S52 in which the coordinates $(x_0, y_0)$ designated by the pointer are detected.

Subsequently, in step S53, the control unit 10 determines whether the coordinates $(x_0, y_0)$ are positioned on the display content of the scroll window 101. If the outcome of step S53 is no, the process returns to step S51 in which the control unit 10 waits for the user to operate the on-button 12A of the mouse 12.

If it is found in step S53 that the coordinates $(x_0, y_0)$ are located on the display content of the scroll window 101, the process proceeds to step S54. In this case, one of the words displayed on the scroll window 101 has been selected (by the selector).

In step S54, the control unit 10 detects the registered number of the selected word (item to be displayed), and in step S55, the control unit 10 stores it in the cell 14A by overwriting the registered number previously stored in the cell 14A.

Then, in step S56, the processing for setting the DOI value is executed in a manner similar to the processing in step S3 of FIG. 4 (steps S11 through S18 of FIG. 6), and a detailed explanation will thus be omitted. Briefly, however, in step S56, the DOI value is calculated based on the registered number newly stored in the cell 14A, and the calculated DOI value is set.

In step S57, the control unit 10 determines whether the off-button 12B of the mouse 12 has been operated. If the result of step S57 is no, the process proceeds to step S58 in which the coordinates $(x_1, y_1)$ designated by the pointer are detected.

In step S59, the control unit 10 detects the direction and the distance ($|x_0-x_1|$) at which the pointer has traveled on the X axis from the coordinates $(x_0, y_0)$ detected in step S52 and the coordinates $(x_1, y_1)$ detected in step S58. That is, the direction and the distance at which the word selected in step S52 has been dragged on the X axis. The direction in which the word has been dragged is determined according to whether the calculated value is a positive or negative value.

In step S60, the control unit 10 determines and sets the zooming level value in accordance with the direction and the distance detected in step S59. In this example, when the word is dragged in the rightward direction, the zooming level value is set to be greater than the previous value. Conversely, when the word is dragged in the leftward direction, the zooming level value is set to be smaller than the previous value. The amount by which the zooming level value is changed becomes greater as the distance at which the word has been dragged increases. Conversely, the amount by which the zooming level value is changed becomes smaller as the distance by which the word has been dragged decreases.

In step S61, the control unit 10 extracts words having the DOI values greater than the zooming level value, and sets them as items to be displayed. In this example, it is assumed that the word selected in step S52 is important to the user, and a greater value, for example, 100, is set as the DOI value in step S18 of FIG. 6. Accordingly, the selected word is again set to be an item to be displayed and is displayed in the scroll window 101.

If it is found in step S57 that the off-button 12B of the mouse 12 has been operated, i.e., the dragging operation is not performed, or the dragging operation is released, the processing is completed.

After executing the processing in step S61, the process proceeds to step S62, which will be discussed later. The above-described processing from step S51 to step S61 is more specifically discussed.

In this example, the user first operates the mouse 12 to move the pointer to the word "graphics". Then, the user further operates the on-button 12A to move the mouse 12 in the rightward direction. That is, the word "graphics" is dragged in the rightward direction.

Upon detecting that the on-button 12A of the mouse 12 has been operated (step S51), the control unit 10 detects the coordinates $(x_0, y_0)$ designated by the pointer (step S52), and determines that the coordinates $(x_0, y_0)$ are positioned on the display content of the scroll window 101 (step S53).

The control unit 10 then detects the registered number of "graphics" (step S54), and stores it in the cell 14A of the storage unit 14 (step S55). Subsequently, the control unit 10 executes the processing for setting the DOI value (step S56), in which case, the registered number 1000 is stored in the cell 14A, as in the case of the initial state, and the DOI value calculated in the initial state is again calculated.

Then, the control unit 10 determines that the off-button 12B of the mouse 12 has not been operated since "graphics" has been dragged in the rightward direction (step S57), and detects the coordinates $(x_0, y_0)$ designated by the pointer (step S58). The control unit 10 then detects that "graphics" has been dragged in the rightward direction by a distance ($|x_0-x_1|$) (step S59).

The control unit 10 determines and sets the zooming level value to be greater than the previous value 0, since it has detected that "graphics" has been dragged in the rightward direction (step S60).

If the zooming level value is set to be, for example, 1, the words shown in FIG. 11 are selected from the words to be displayed shown in FIG. 10 and are determined as target items (step S61). If the zooming level value is smaller than 1, for example, 0.5, target items the same as those when the zooming level value is 1 are selected, since the DOI value is an integer.

Figure 12:
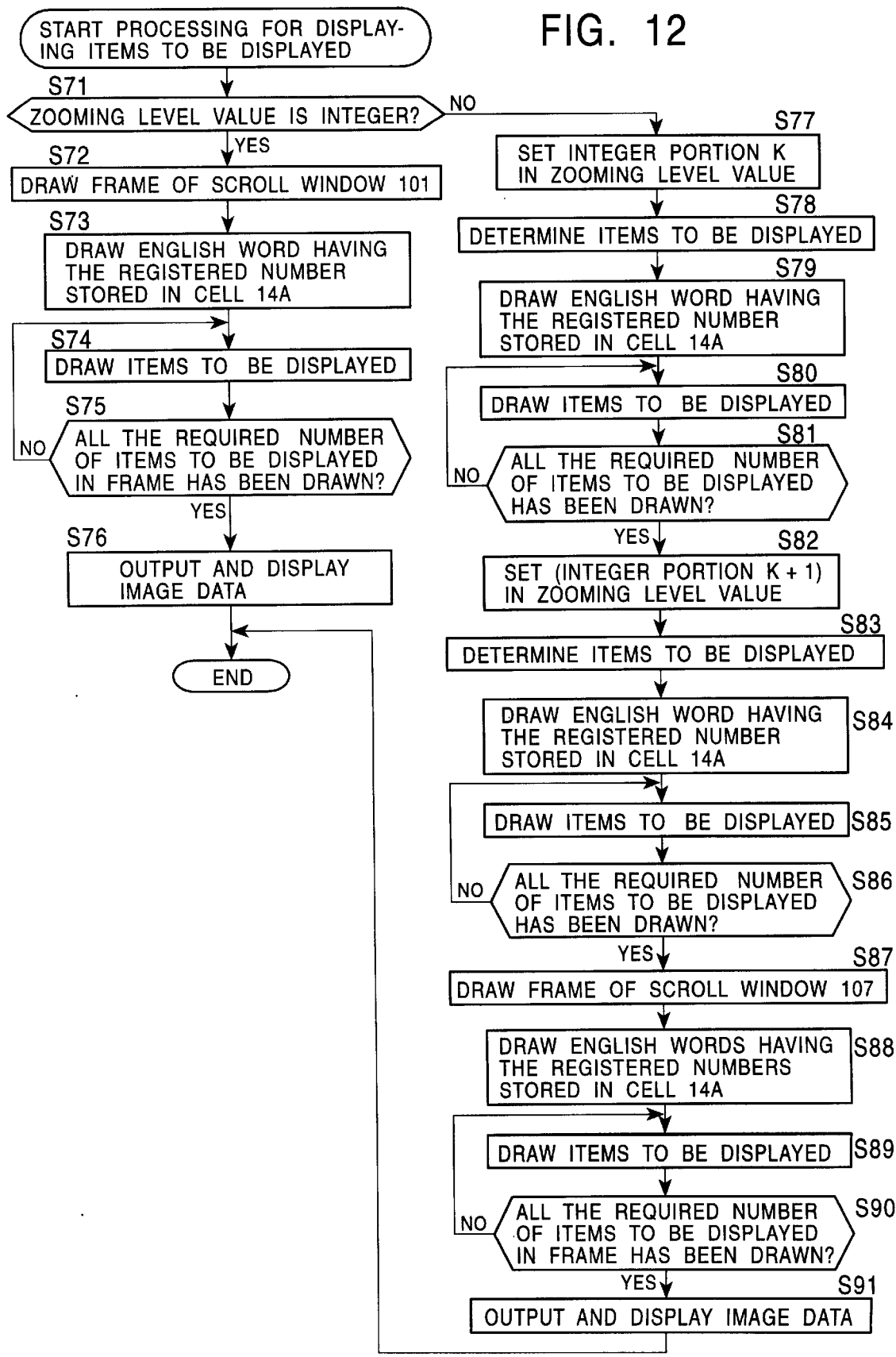
FIG. 12 is a flow chart illustrating the processing for displaying items to be displayed.

After determining the items to be displayed in step S61, the process proceeds to step S62. In step S62, the control unit 10 controls the display controller 15 to select the predetermined words from the words to be displayed and to display them on the monitor 16. The processing for displaying the target items executed in step S62 is now described in detail with reference to the flow chart of FIG. 12.

Figure 9:
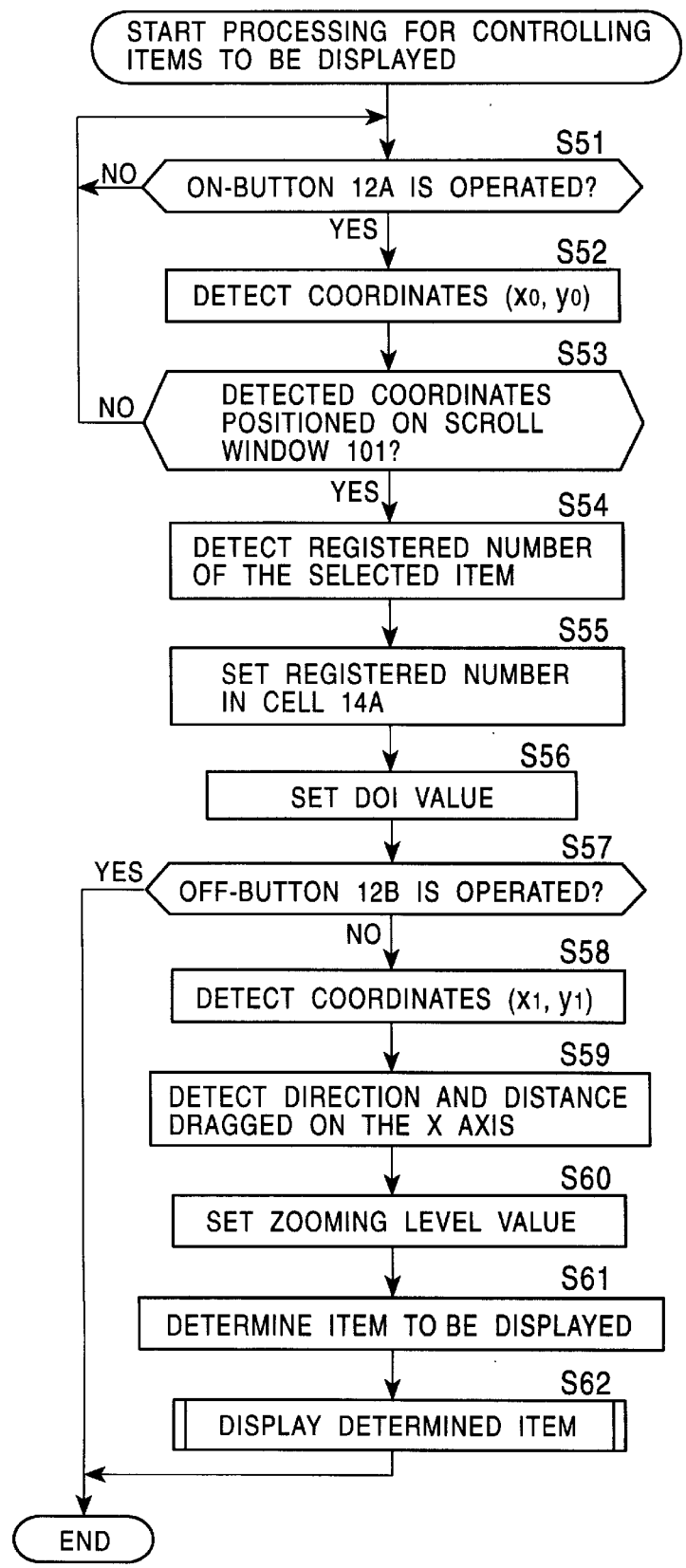
FIG. 9 is a flow chart illustrating the processing for controlling items to be displayed.

The control unit 10 determines in step S71 whether the zooming level value set in step S60 of FIG. 9 is an integer. If the outcome of step S71 is yes, the process proceeds to step S72 in which the frame, such as the scroll window 101 shown in FIG. 2, in which the words are to be displayed, is drawn in the VRAM 15A of the display controller 15.

Then, in step S73, the control unit 10 draws the word having the registered number stored in the cell 14A in step S55 at a predetermined position of the frame drawn in the VRAM 15A in step S72.

In step S74, the control unit 10 sequentially draws words to be displayed starting from the word having the registered number closest to the registered number drawn in step S73 (in alphabetical order or in the reverse order). Thereafter, the control unit 10 determines in step S75 whether all of the words to be drawn in the frame (in this example, ten words) have been drawn. If the outcome of step S75 is no, the process returns to step S74, and the processing of step S74 is repeatedly executed.

If it is found in step S75 that all of the words have been drawn, the process proceeds to step S76. In step S76, the control unit 10 controls the display controller 15 to read the image data from the VRAM 15A and to display it on the monitor 16. As a result, the scroll window 101 of the search screen shown in FIG. 13 is displayed on the monitor 16.

Figure 13:
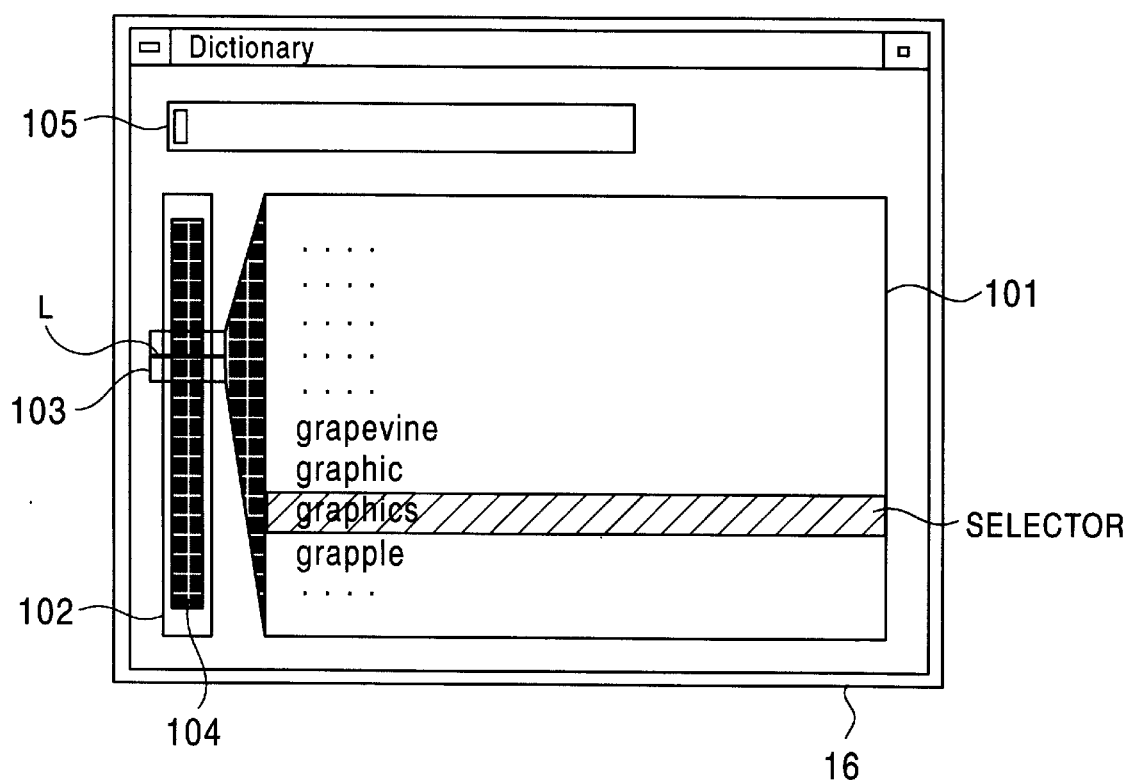
FIG. 13 illustrates still another example of the search screen displayed on the display unit 16 shown in FIG. 1.

FIG. 13 illustrates the search screen when the zooming level value is set to be 1, and only four words are selected from the ten words displayed on the scroll window 101 shown in FIG. 2. In this manner, the user drags the selected item by operating the mouse 12 to select a new item to be displayed, thereby controlling items to be displayed in the scroll window 101.

After the target items selected when the zooming level value is set to be an integer are displayed in the scroll window 101, the process returns to the flow chart of FIG. 9, and the processing is completed.

If it is found in step S71 that the zooming level value set in step S60 of FIG. 9 is not an integer, the process proceeds to step S77. In step S77, the control unit 10 divides the zooming level value into an integer portion k and a decimal portion f and sets the integer portion k in the zooming level value. Then, in step S78, the control unit 10 extracts the words having DOI values greater than the zooming level value and determines them to be items to be displayed.

Subsequently, in step S79, the control unit 10 draws the word having the registered number stored in the cell 14A in a predetermined area of the VRAM 15A. In step S80, the control unit 10 sequentially draws words starting from the word having the registered number closest to the registered number of the word drawn in step S79 (in alphabetical order or in the reverse order). The control unit 10 then makes a determination of whether all of the words which have been determined to be displayed in step S78 have been drawn in the VRAM 15A. If there is any word left which has not yet been drawn, the process returns to step S80, and the corresponding processing is executed.

If it is found in step S81 that all of the words to be displayed have been drawn, the process proceeds to step S82 while retaining the image data k in the VRAM 15A. In step S82, the control unit 10 adds one to the integer k and sets the resulting value (integer k+1) as the zooming level value.

The processing from step S83 to step S86 is similar to that from step S78 to step S81, and an explanation thereof will thus be omitted.

If it is determined in step S86 that all of the words to be displayed have been drawn, the process proceeds to step S87 while retaining the image data (k+1) in the VRAM 15A together with the image data k. In step S87, the control unit 10 draws the frame, such as the scroll window 101 shown in FIG. 2, in the VRAM 15A of the display controller 15. The frame is drawn in a different area of the VRAM 15A from the area where the image data k and the image data f are stored.

Then, in step S88, the control unit 10 draws the word having the registered number stored in the cell 14A in step S55 of FIG. 9 at a predetermined portion of the frame drawn in the VRAM 15A in step S87.

In step S89, the control unit 10 sequentially draws the words, which are determined to be displayed in step S61 of FIG. 9, starting from the word having the registered number closest to the registered number drawn in step S88 (in alphabetical order or the reverse order). In this case, the words to be displayed are drawn in the area corresponding to the Y-axis distance YD starting from the word drawn in step S88. The distance YD is expressed by the following equation:

$$YD = YA \times (1-f) + YB \times f$$

where f indicates the decimal portion f of the zooming level value set in step S60 and is, in this case, 0.5.

The distances YA and YB are calculated as follows when the zooming level value is set to be, for example, 0.5 in step S60.

Figure 14A:
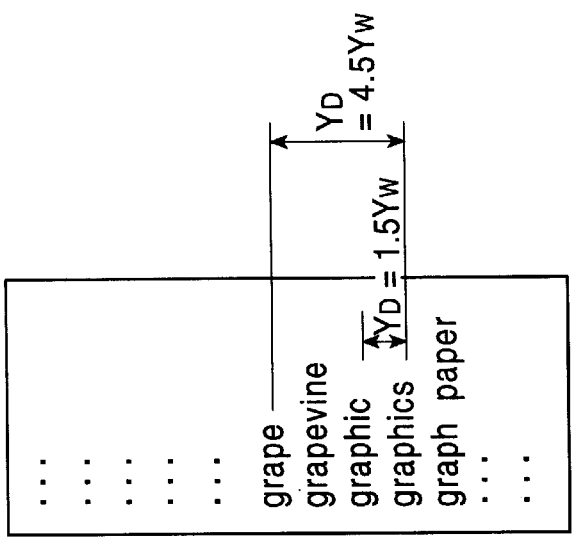
FIGS. 14A, 14B, and 14C illustrate English words displayed in the scroll window 101.

In this case, the integer portion k of the zooming level value is 0. Accordingly, by executing the processing from step S77 to step S81, the image data k obtained when the zooming level value is set to be 0 is drawn in the VRAM 15A, as illustrated in FIG. 14A. By executing the processing from step S82 to step S86, the image data (k+1) obtained when the zooming level value is set to be 1 is drawn in the VRAM 15A, as shown in FIG. 14B.

Figure 14B:
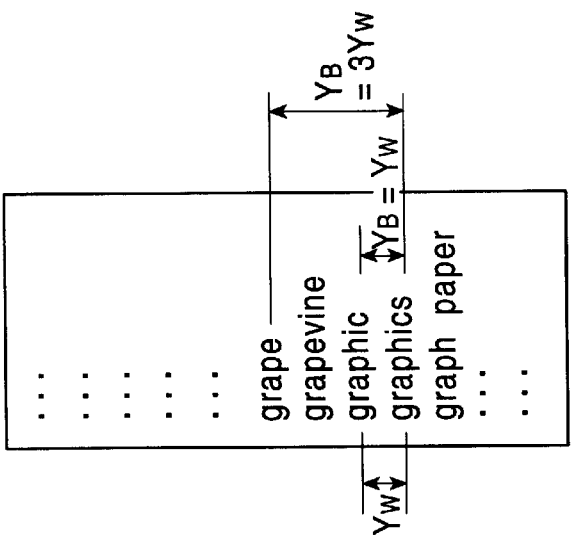

$Y_B$ in FIG. 14B represents the distance between the word "graphics" (selected by the selector) and another word, which is currently drawn. For example, when the distance between adjacent words is indicated by $Y_W$, the distance between "graphics" and "graphic" is $Y_w$, and thus, $Y_B = Y_W$ holds true. The distance between "graphics" and "grape" is three times as long as $Y_w$, and thus, $Y_B = 3Y_B$ holds true.

$Y_A$ in FIG. 14A represents the distance between the word "graphics" and the word used when $Y_B$ is calculated, i.e., "graphic". For example, since the distance between "graphics" and "graphic" is twice as long as $Y_w$, $Y_A = 2Y_w$ hold true. The distance between "graphics" and "grape" is six times as long as $Y_w$, and then, $Y_A = 6Y_w$ holds true.

Considering the above-mentioned factors, "graphic", which is drawn at the position above "graphics" by the distance $Y_w$ in FIG. 14B, is drawn at the position above "graphics" by the distance $2Y_w$ in FIG. 14A. Accordingly, when the zooming level value is set to be 0.5, "graphic" is drawn at the position above "graphics" by $1.5Y_W$ according to the calculation expressed by the following equation.

$$YD = 2Y_w \times (1-0.5) + Y_w \times 0.5 = 1.5Y_W$$

Additionally, "grape", which is drawn at the position above "graphics" by the distance $3Y_w$ in FIG. 14B, is drawn at the position above "graphics" by the distance $6Y_w$ in FIG. 14A. Accordingly, when the zooming level value is set to be 0.5, grape" is drawn at the position above "graphics" by $4.5Y_w$ according to the calculation expressed by the following equation.

$$YD = 6Y_w \times (1-0.5) + 3Y_w \times 0.5 = 4.5Y_w$$

Figure 14C:
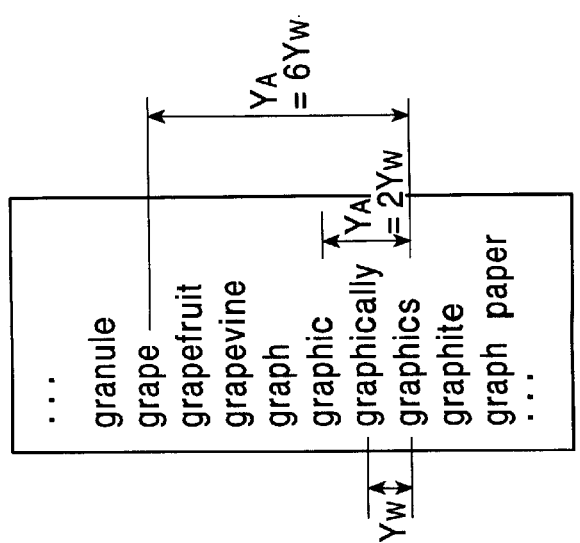

In this manner, words to be displayed when the zooming level value is set to be 0.5 are drawn in the VRAM 15A, as shown in FIG. 14C. As stated above, words to be displayed when the zooming level value is set to be 0.5 are similar to those when the zooming level value is set to be 1, and thus, the same words as those shown in FIG. 14B are drawn.

Referring back to FIG. 12, the control unit 10 determines in step S90 whether all of the words to be displayed in the frame drawn in step S87 have been drawn. If there is any word which has not yet been drawn, the process returns to step S89 in which the corresponding processing is executed.

If the result of step S90 is yes, the image data f is stored in the VRAM 15A. Thereafter, the process proceeds to step S91 in which the control unit 10 controls the display controller 15 to read the image data f from the VRAM 15A and to display it on the monitor 16. When the words shown in FIG. 14C are displayed in the scroll window 101, the processing is completed. Then, the process returns to the flow chart of FIG. 9, and the processing is completed.

Figure 15:
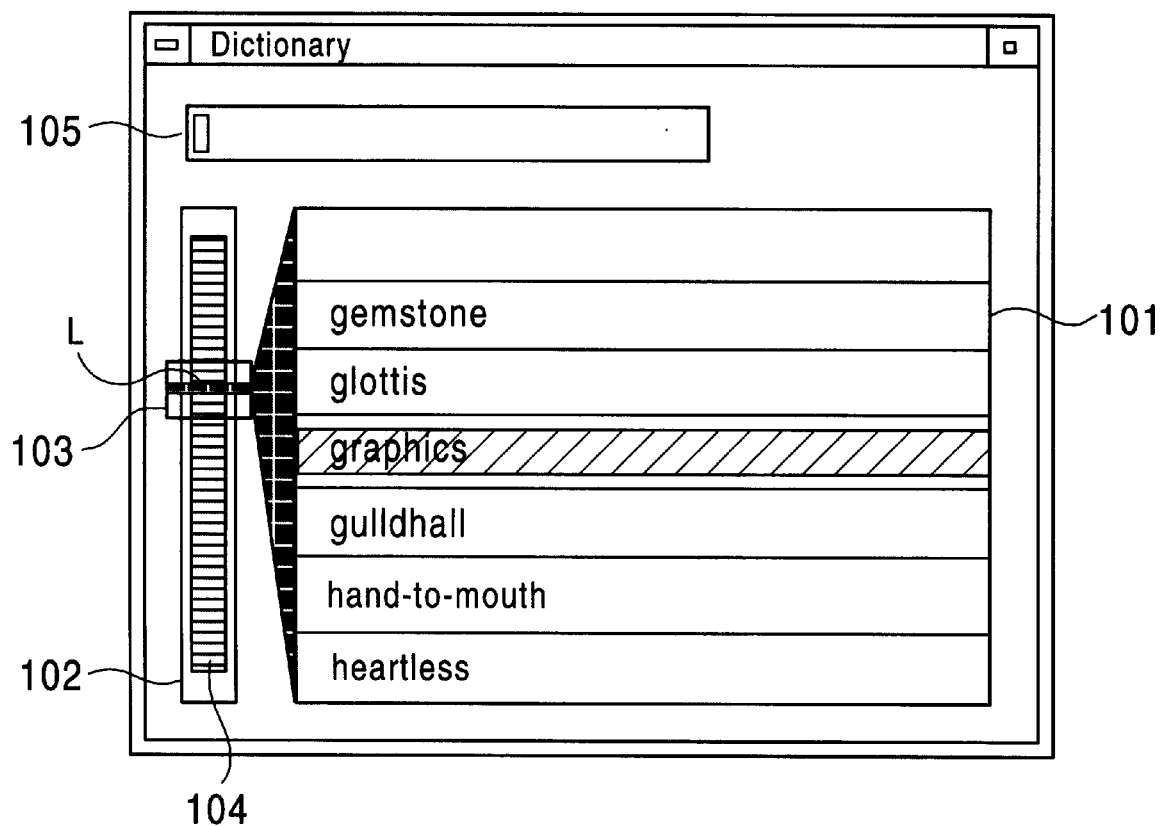
FIG. 15 illustrates a further example of the search screen displayed on the display unit 16 shown in FIG. 1.

According to the foregoing description, the user is able to restrict items to be displayed in the scroll window 101 by operating the mouse 12. FIG. 15 illustrates the search screen when the zooming level value is set to be approximately 9. FIG. 16 illustrates the search screen when the zooming level value is set to be 10 or greater. In the examples shown in FIGS. 15 and 16, words to be displayed are limited more precisely than the words shown in FIG. 2 or 14C.

The processing for retrieving words that match a keyword input into the input section 105 is now described in detail with reference to the flow chart of FIG. 17.

It is now assumed that the search screen shown in FIG. 2 is displayed on the monitor 16, i.e., the registered number 1000 of "graphics" is stored in the cell 14A, and that the zooming level value is set to be 0. In step S101, the control unit 10 waits for the user to input a predetermined keyword (alphabet) by operating the keyboard 13. When the predetermined keyword is input in step S101, the process proceeds to step S102 in which the control unit 10 reads the words matching the keyword from the English-word dictionary D, and stores the registered numbers of the read words in the keyword-matching-item storage area 14B.

For example, if "g" is input into the input section 105, words starting with "g" are read from the English-word dictionary D, and the corresponding registered numbers are stored in the keyword-matching-item storage area 14B. If a predetermined letter preceded by a space, for example, "q", is input into the input section 105, words including "q" are read from the English-word dictionary D, and the corresponding registered numbers are accordingly stored in the keyword-matching-item storage area 14B. Further, if a predetermined letter between two spaces is input, for example, "m", " "(space), "d", " "(space), "t", " "(space), "r", " "(space), and "n" are input into the input section 105, words including the above letters in this order are read from the English-word dictionary D, and the corresponding registered numbers are stored in the keyword-matching-item storage area 14B.

In step S103, the control unit 10 selects a predetermined registered number, for example, the smallest registered number, from the registered numbers stored in the keyword-matching-item storage area 14B in step S102, and stores it in the cell 14A of the storage unit 14.

Figure 18:
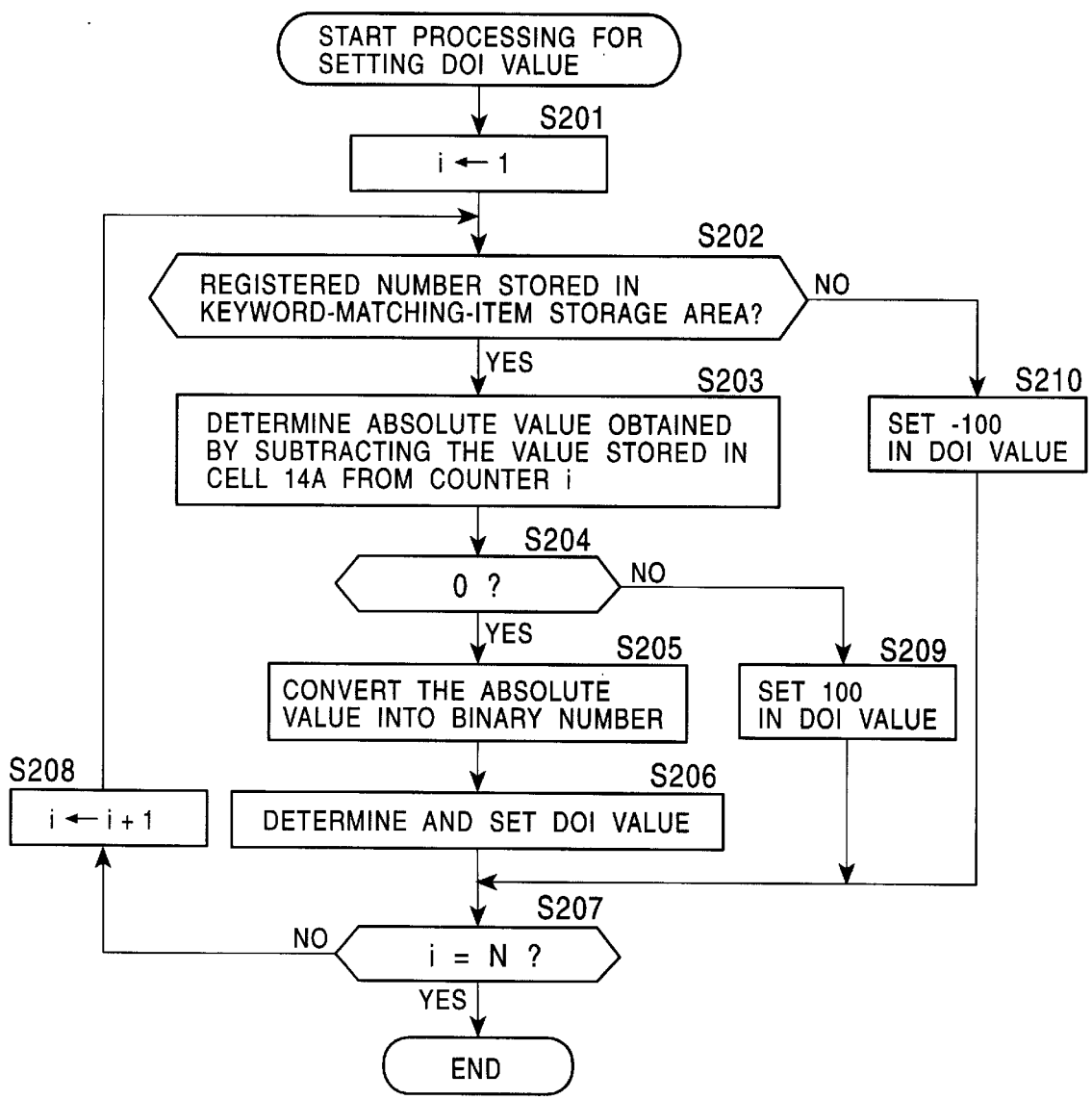
FIG. 18 is a flow chart illustrating the processing for setting the DOI value.

Then, in step S104, the control unit 10 sets the DOI values for the individual words registered in the English-word dictionary D. The processing for setting the DOI values in step S104 is discussed in detail below with reference to the flow chart of FIG. 18.

In step S201, the control unit 10 sets 1 (initial value) in the counter i for counting the number of registered numbers. The control unit 10 then determines in step S202 whether the registered number corresponding to the counter i is stored in the keyword-matching-item storage area 14B, that is, whether the word having the registered number stored in the counter i is a word that matches the keyword input into the input section 105.

If the outcome of step S202 is yes, the process proceeds to step S203.

Figure 6:
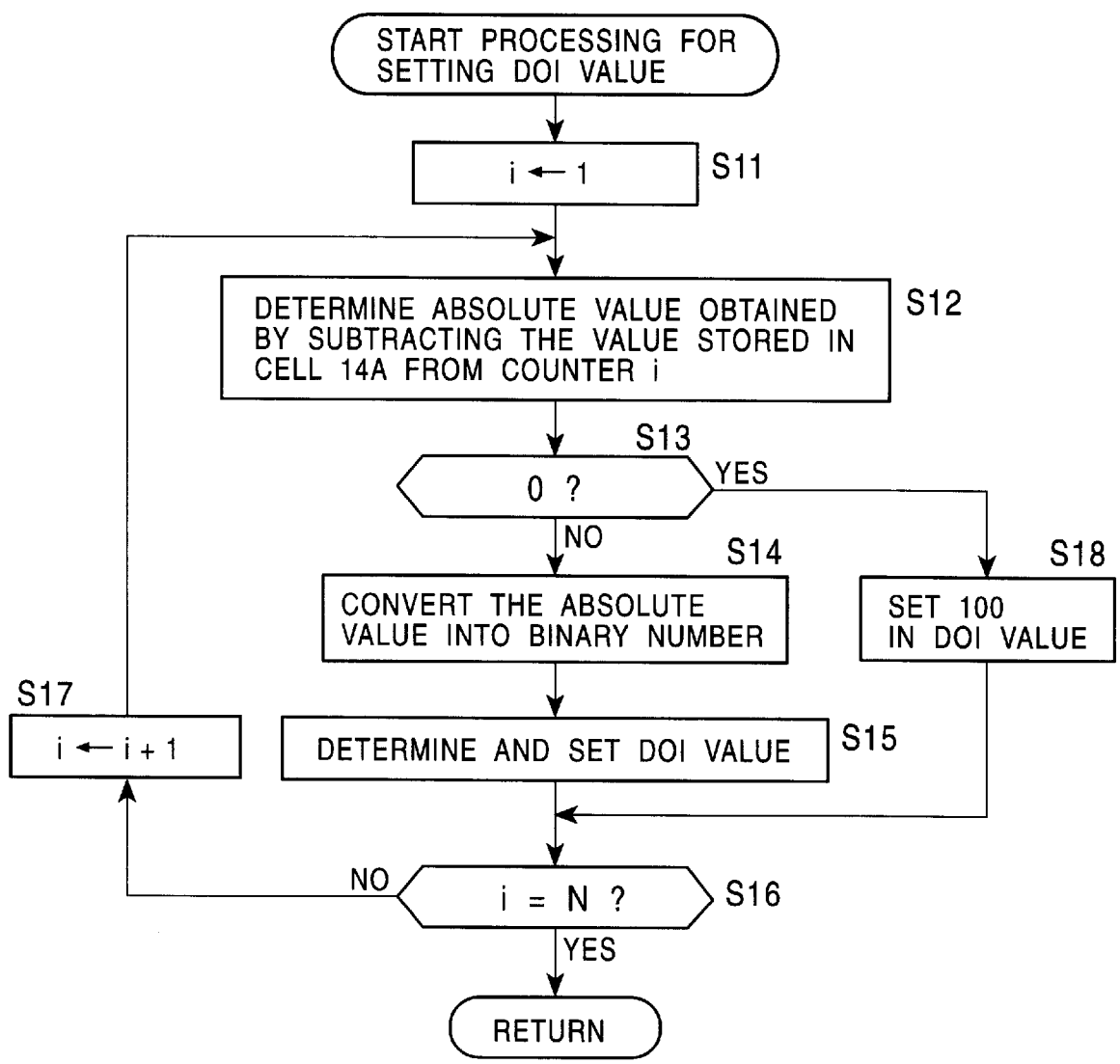
FIG. 6 is a flow chart illustrating the processing for setting the DOI value.

The processing from step S203 to step S209 is similar to that from step S12 to step S18 of FIG. 6, and an explanation thereof will thus be omitted. Briefly, however, the DOI value calculated based on the registered number stored in the cell 14A in step S103 is set in the word that matches the keyword input into the input section 105.

If it is found in step S202 that the registered number corresponding to the counter i is not stored in the keyword-matching-item storage area 14B, the process proceeds to step S210. In step S210, a small number, for example, -100, is set in the DOI value for the word having the registered number corresponding to the counter i. That is, the DOI value -100 is set for the word having a registered number which is not stored in the keyword-matching-item storage area 14B. The process then proceeds to step S207.

The control unit 10 makes a determination in step S207 of whether DOI values are set for all of the words registered in the English-word dictionary D, i.e., whether i=N. If the result of step S207 is yes, the processing for setting the DOI values is completed, and the process further proceeds to step S105 of FIG. 17. If the outcome of step S207 is no, the process proceeds to step S208 in which the counter i is incremented by one. The process then returns to step S202 in which the corresponding processing is executed.

In step S105, the control unit 10 sets a predetermined value in the zooming level value. In step S106, the control unit 10 then extracts words having DOI values greater than the zooming level value, and determines them as items to be displayed. In this example, if the zooming level value is set to be 0, words that match the keyword are displayed in the scroll window 101, and words that do not match the keyword are not displayed in the scroll window 101 since the DOI value -100 is set for such words.

In step S107, the control unit 10 controls the display controller 15 to select predetermined words from the words determined to be displayed in step S106 and to display them on the monitor 16. The processing in step S107 is executed similarly to that in step S6 of FIG. 4 (steps S21 through S25 of FIG. 7), and an explanation thereof will thus be omitted.

Figure 19:
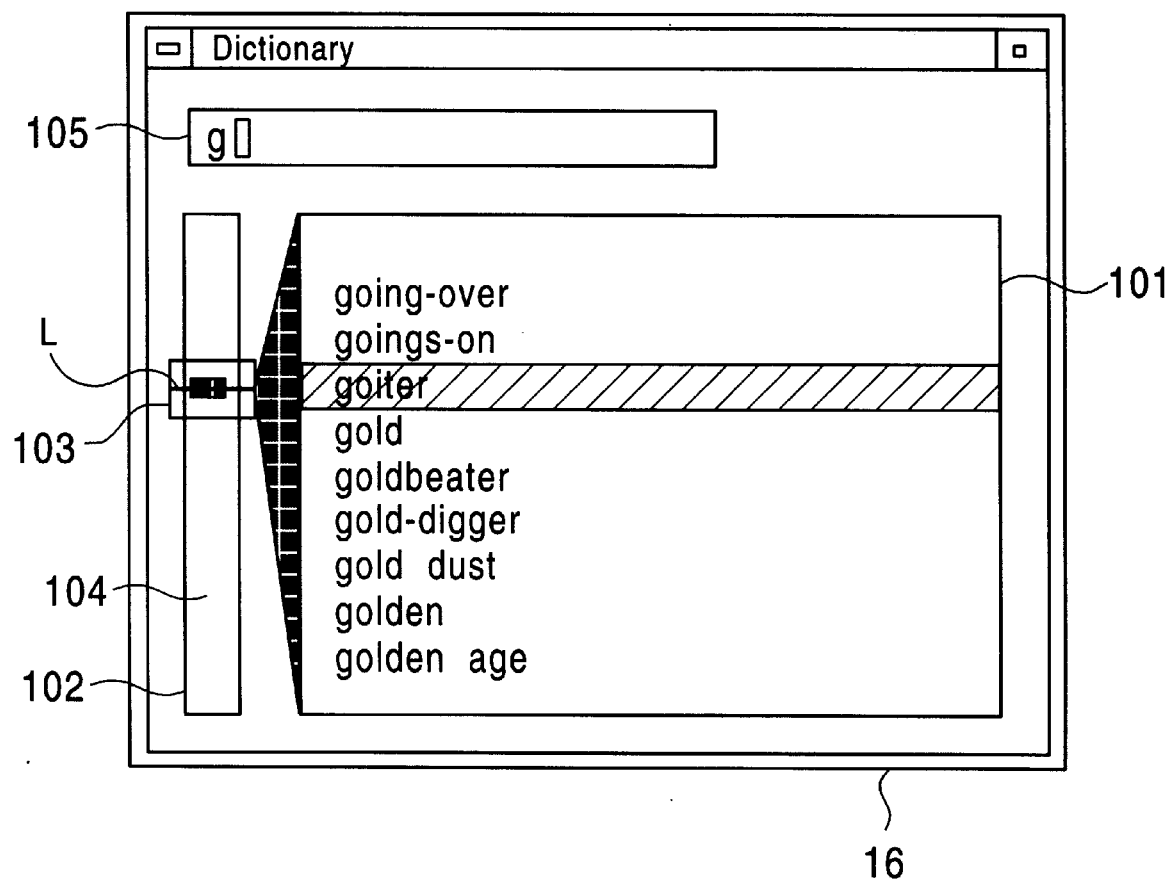
FIG. 19 illustrates a further example of the search screen displayed on the display unit 16 shown in FIG. 1.
Figure 20:
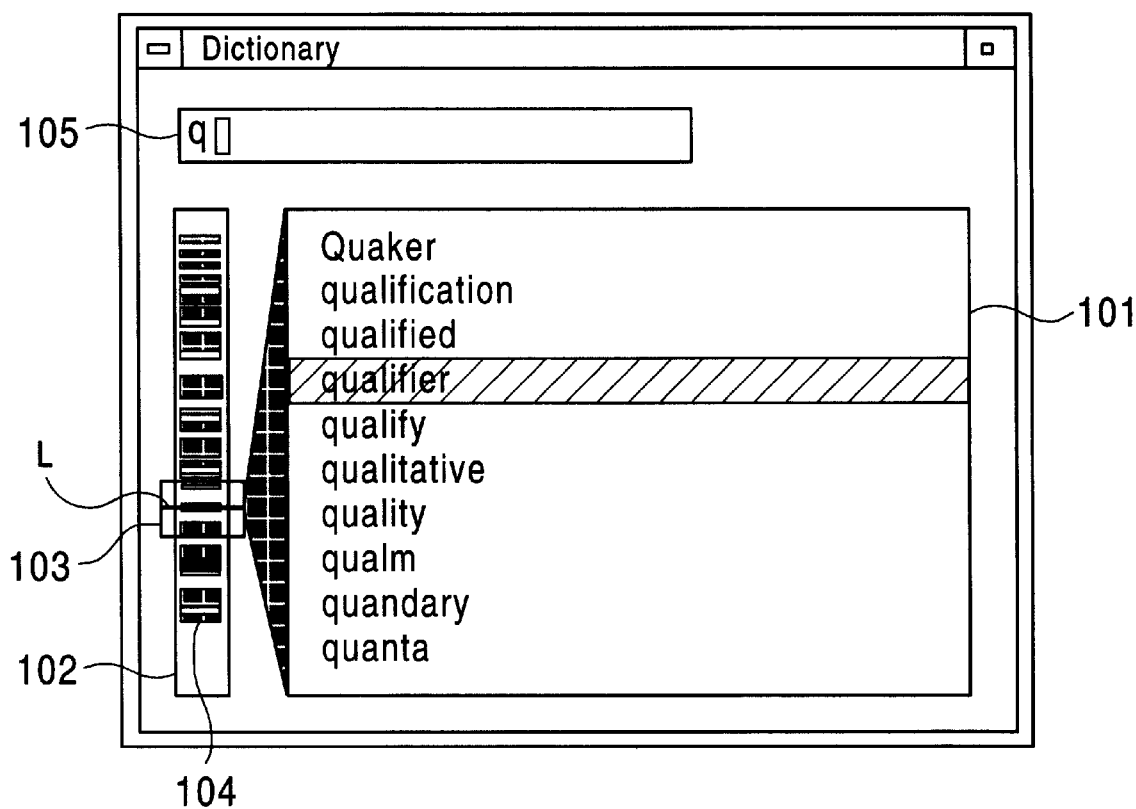
FIG. 20 illustrates a further example of the search screen displayed on the display unit 16 shown in FIG. 1.
Figure 21:
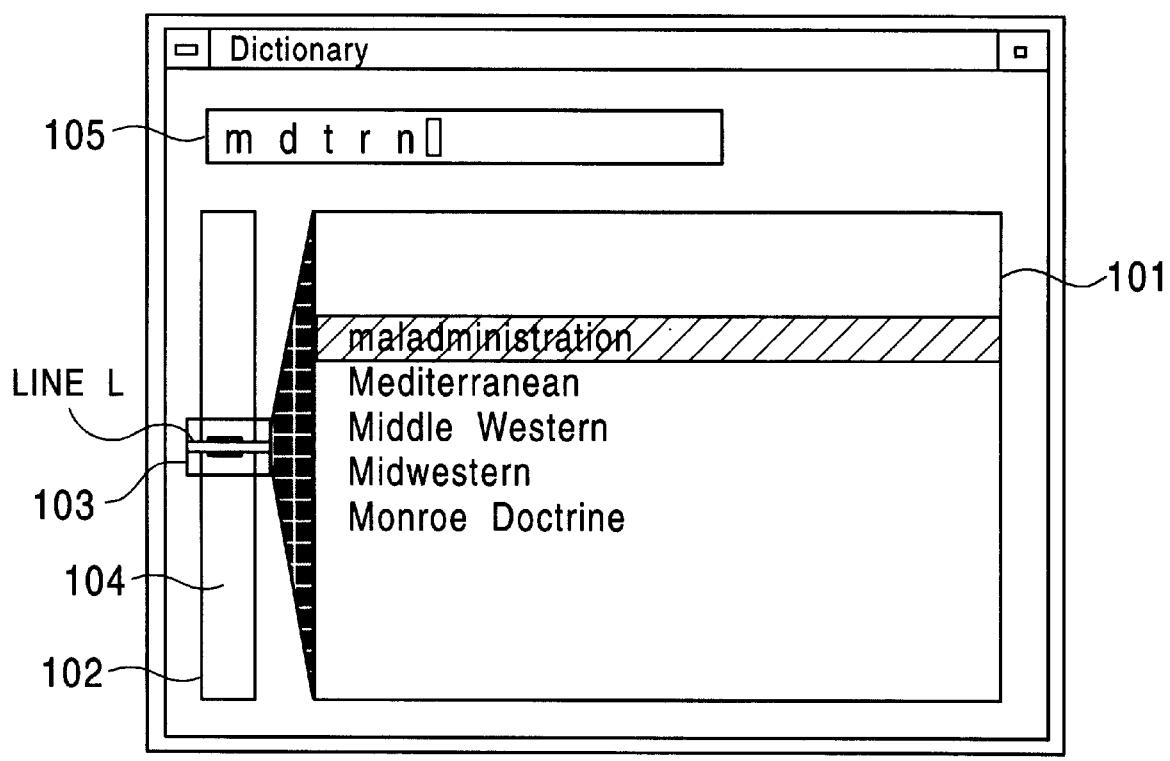
FIG. 21 illustrates a further example of the search screen displayed on the display unit 16 shown in FIG. 1.

As discussed above, words that match the keyword input into the input section 105 are determined to be items to be displayed and are displayed in the scroll window 101. FIG. 19 illustrates the search screen when "g" is input into the input section. FIG. 20 illustrates the search screen when "q" preceded by " "(space) is input into the input section 105. FIG. 21 illustrates the search screen when "m", " "(space), "d", " "(space), "t", " "(space), "r", " "(space), and "n" are input into the input section 105.

Figure 22:
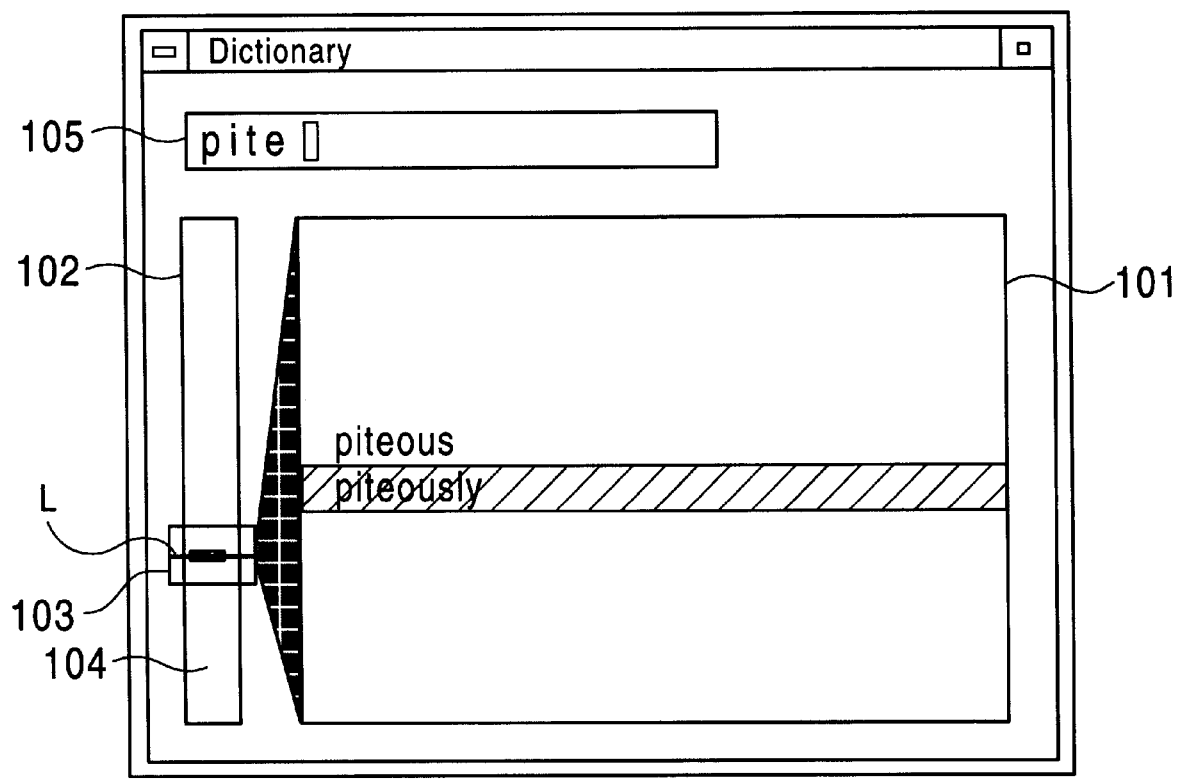
FIG. 22 illustrates a further example of the search screen displayed on the display unit 16 shown in FIG. 1.
Figure 23:
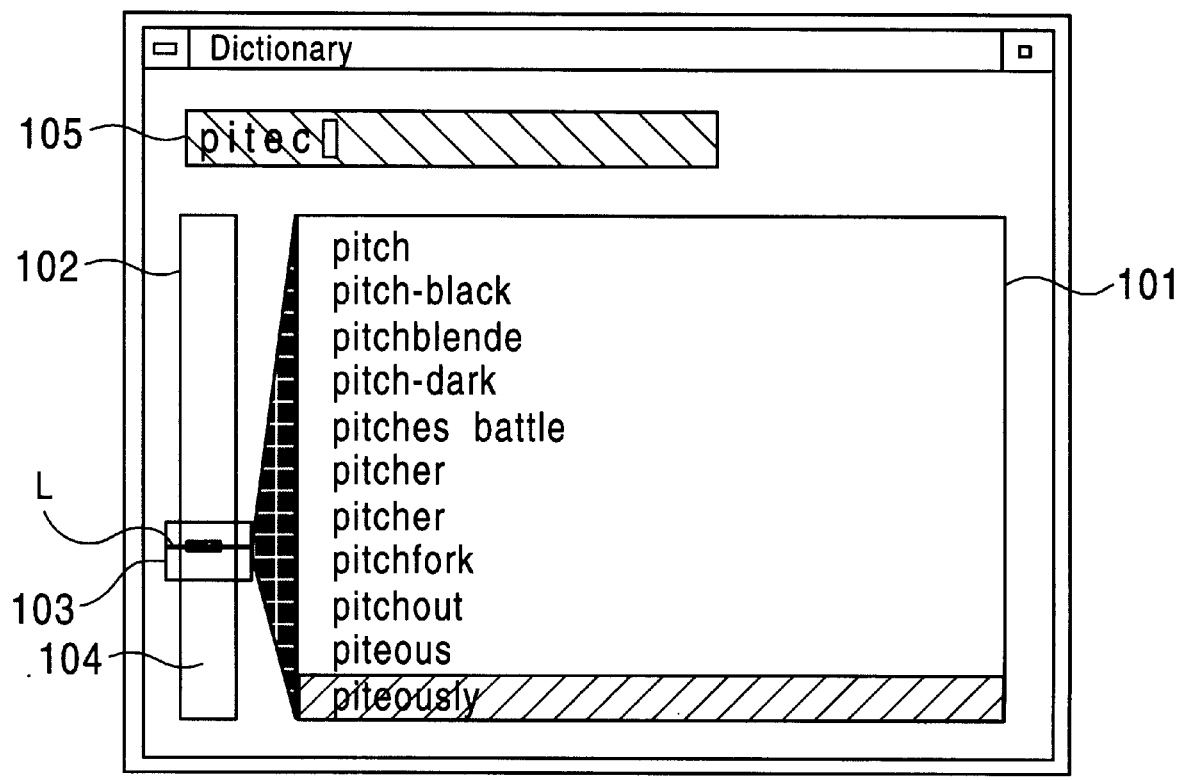
FIG. 23 illustrates a further example of the search screen displayed on the display unit 16 shown in FIG. 1.
Figure 24:
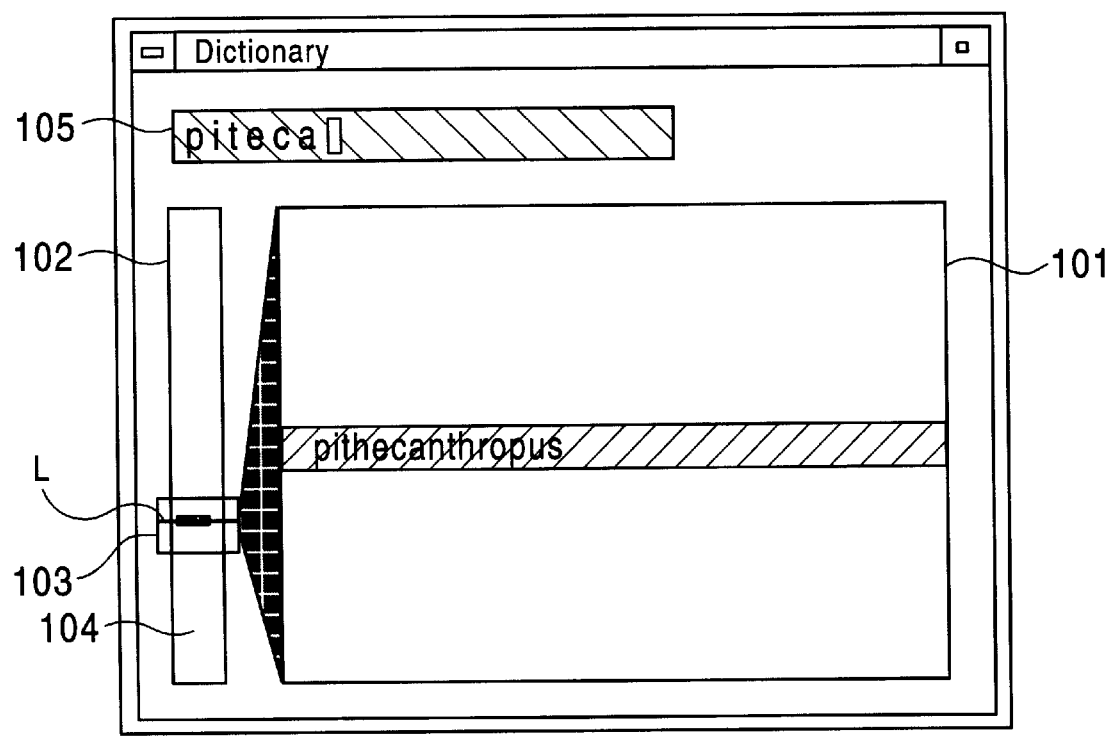
FIG. 24 illustrates a further example of the search screen displayed on the display unit 16 shown in FIG. 1.

A further description is now given of the processing for retrieving words that match the keyword with reference to FIGS. 22 through 24.

It is now assumed that the word "pithecanthropus" is to be searched for and displayed when the user is not certain about the correct spelling of the word.

In the state in which the search screen shown in FIG. 2 is displayed on the monitor 16, the user operates the keyboard 13 to input, for example, "pite", which may be the first portion of the word. Then, the processing from step S102 to step S107 of FIG. 17 is executed, and the words starting with "pite" are displayed in the scroll window 101, in which case, two words are displayed, as illustrated in FIG. 22.

The user checks the words displayed in the scroll window 101 of the search screen shown in FIG. 22, and recognizes that the desired word is not displayed. Then, the user inputs "c" after the previous input "pite", and the processing from step S102 to step S107 is again executed. Thus, the corresponding words are determined to be items to be displayed and are partially displayed in the scroll window 101, as illustrated in FIG. 23.

Since words starting with "pitec" are not registered in the English-word dictionary D, the words beginning with "pitch" and "piteous", which are slightly different from "pitec", are displayed in the scroll window 101. When the words displayed in the scroll window 101 do not completely match the keyword input into the input section 105, a predetermined warning is given by indicating the input section 105 differently from the normal display, for example, the input section 105 is highlighted in a predetermined color.

The user operates the mouse 12 to search for the desired word by scrolling the display content of the scroll window 101. However, since "pithecanthropus" is not displayed, the user is unable to search for it from the words displayed in the scroll window 101. Then, if, for example, "a" is input after "pitec", "pithecanthropus" is displayed in the scroll window 101, as illustrated in FIG. 24, though it is slightly different from "piteca". The user checks the display of the scroll window 101 and acknowledges that "pithecanthropus" matches the word desired by the user.

In this manner, information which may possibly match a desired item can be input into the input section 105, thereby displaying the desired item in the scroll window 101.

Figure 25:
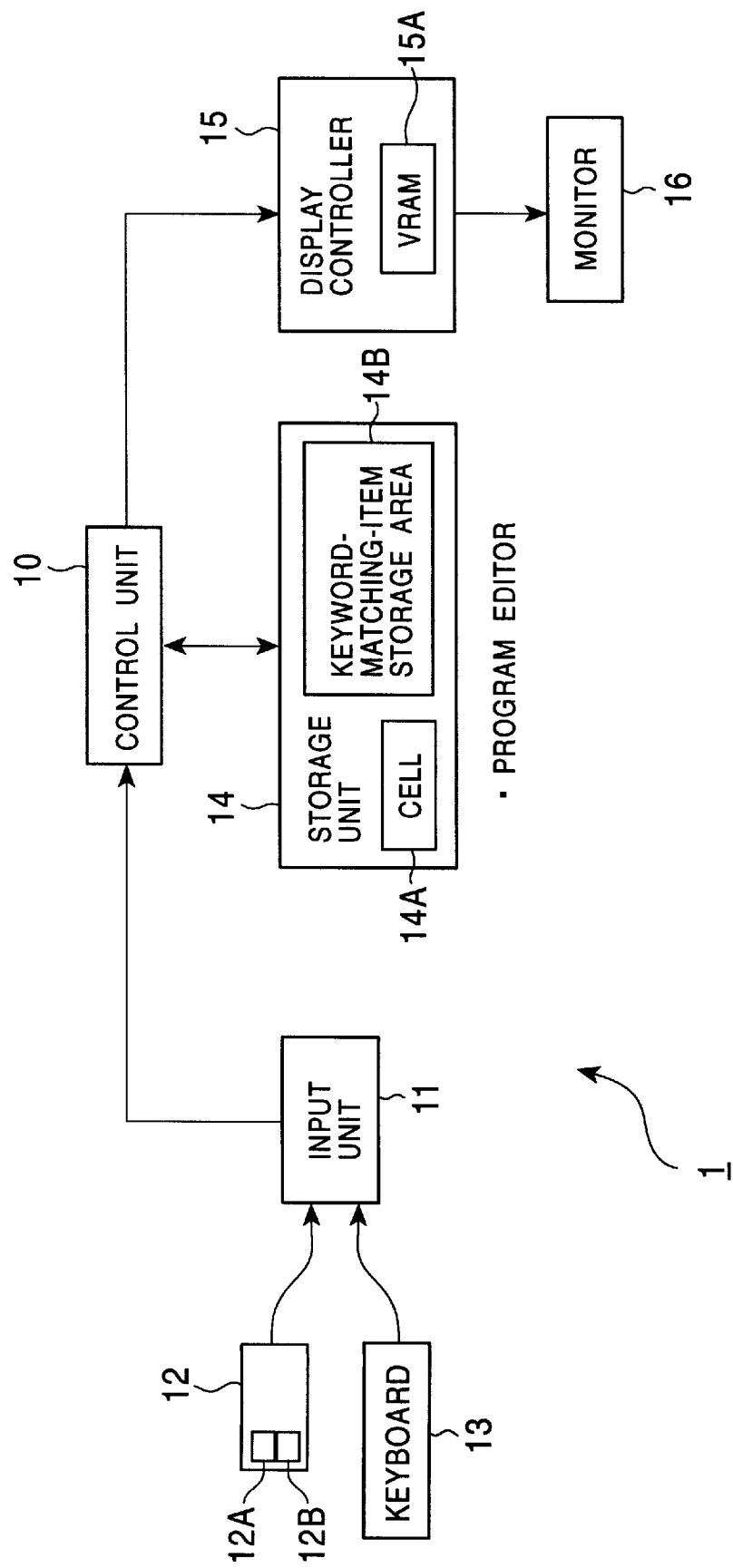
FIG. 25 is a block diagram illustrating the personal computer 1 incorporating a second embodiment of the present invention.

A description is given below of the personal computer 1 incorporating a second embodiment of the present invention with reference to FIG. 25. The same elements as those shown in FIG. 1 are indicated by like reference numerals, and an explanation thereof will thus be omitted.

A program editor corresponding to an object-oriented program provided with a display-item control function is stored in the storage unit 14.

Figure 26:
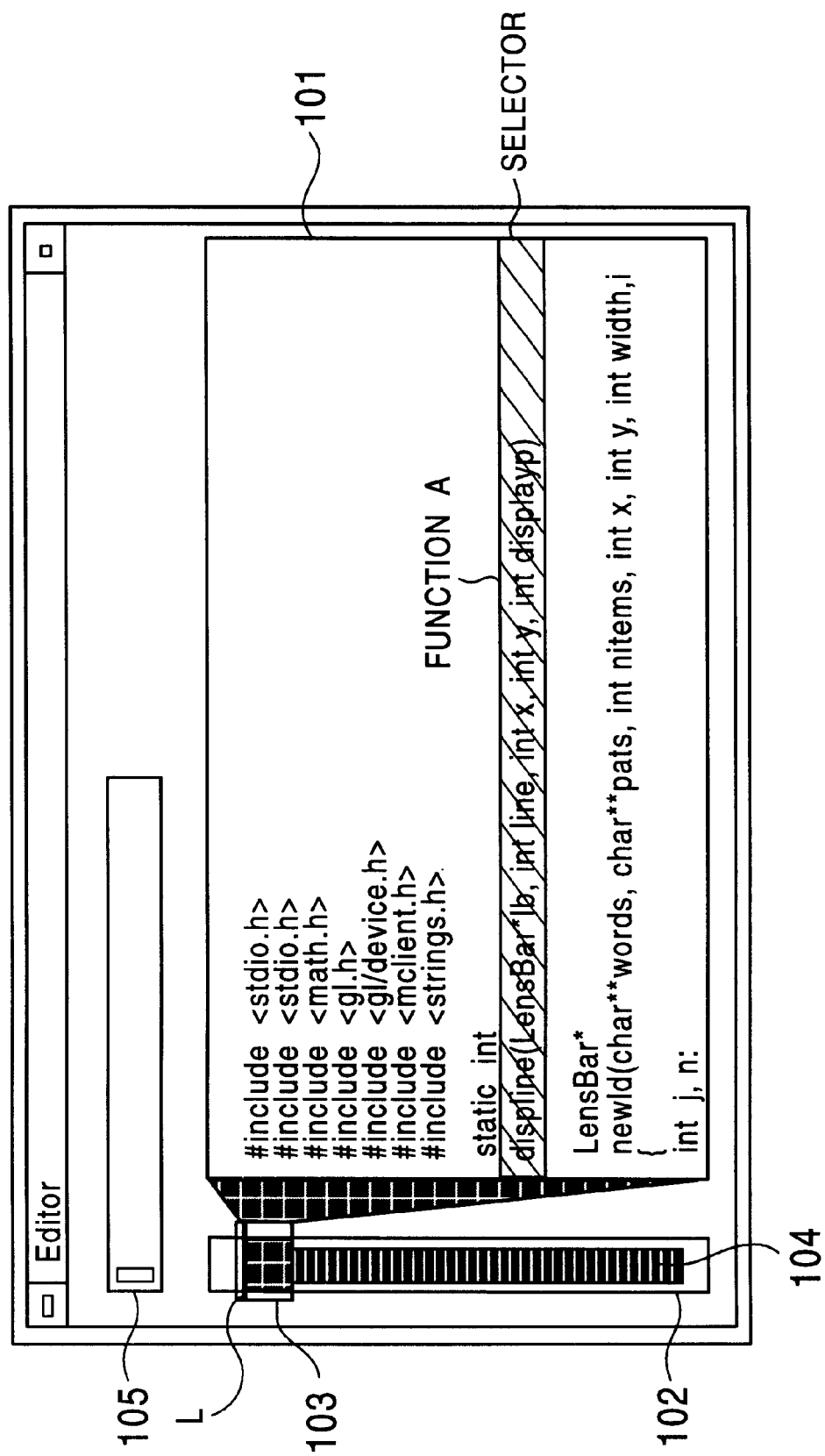
FIG. 26 illustrates an example of a search screen displayed on the display unit 16 shown in FIG. 25.

FIG. 26 illustrates an edit screen of the program editor, which is formed of the scroll window 101, the scroll bar 102, the knob 103, the position-bar indicator 104, and the input section 105, such as those shown in the search screen of FIG. 2. A predetermined source program is displayed in the scroll window 101.

Figure 8:
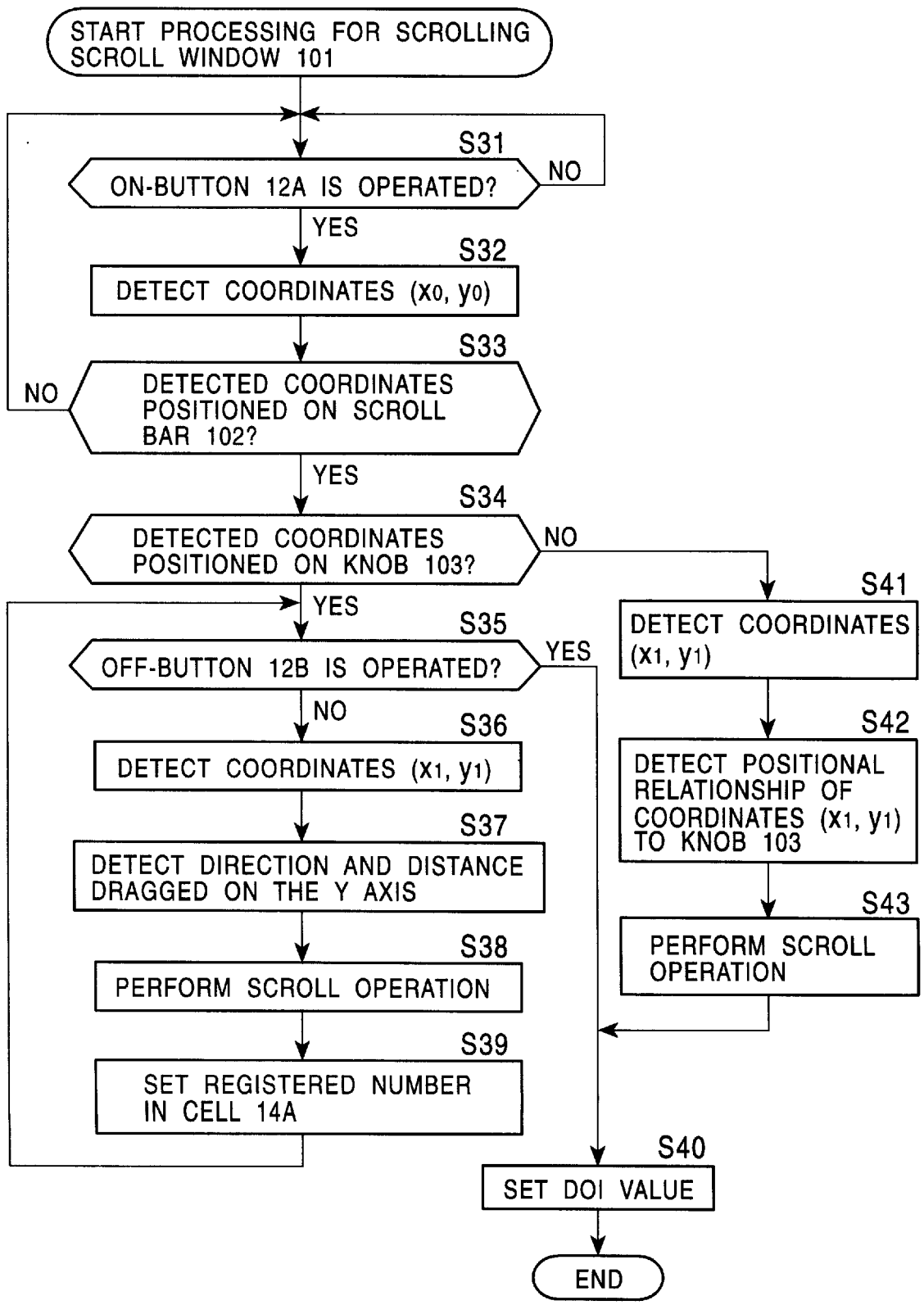
FIG. 8 is a flow chart illustrating the processing for scrolling the display content of the scroll window 101.

According to the above-described program editor, processing similar to that from step S1 to step S6 of FIG. 4 is executed to output the display of the scroll window 101, and processing similar to that from step S31 to step S43 of FIG. 8 is executed to scroll the display content of the scroll window 101.

Figure 17:
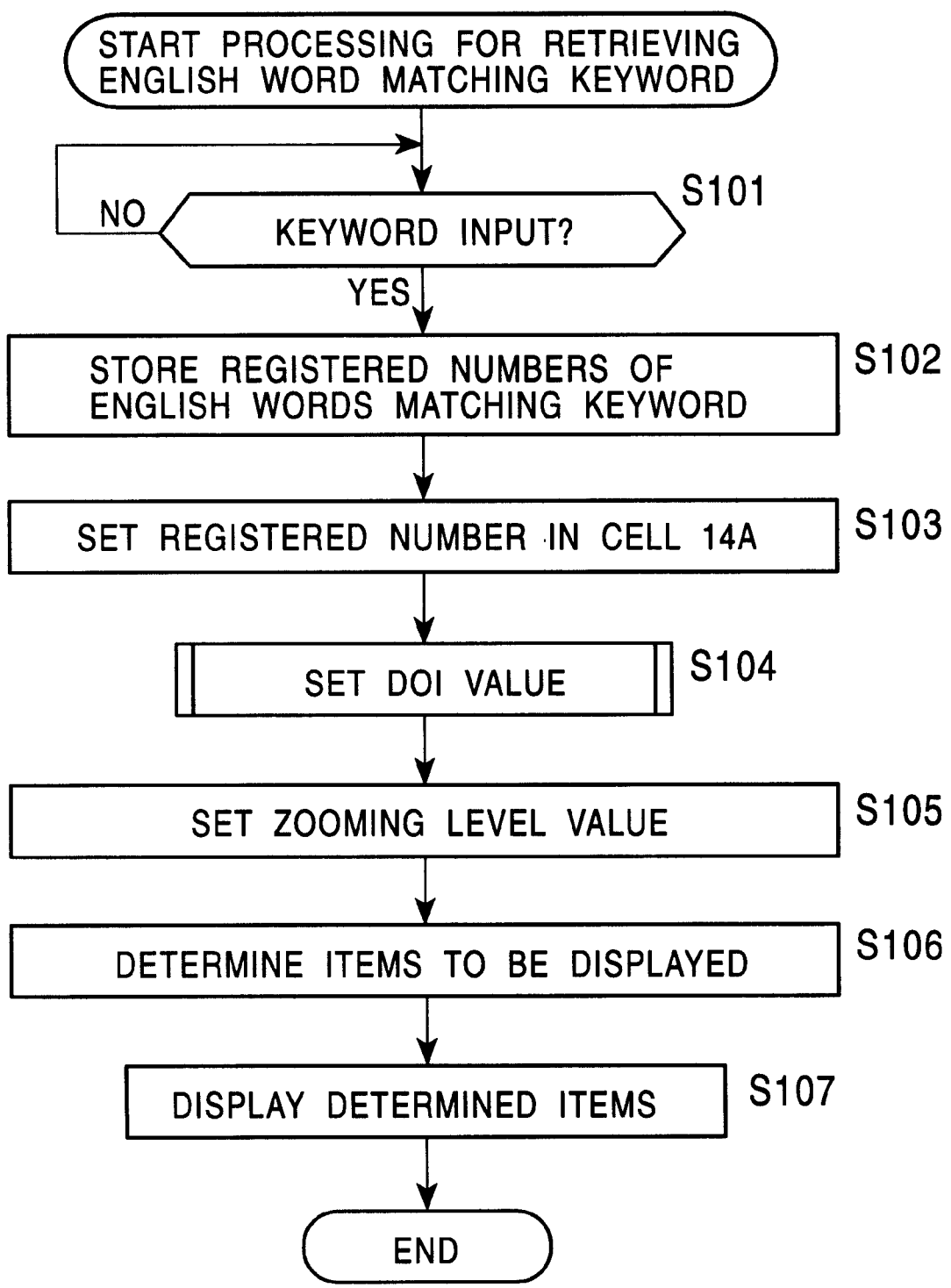
FIG. 17 is a flow chart illustrating the processing for retrieving words matching a keyword.

Processing similar to that from step S51 to step S62 of FIG. 9 is performed to control items to be displayed, and processing similar to that from step S101 to step S107 of FIG. 17 is performed to search for words matching a keyword input into the input section 105.

The processing for controlling items to be displayed is now discussed with reference to the flow chart of FIG. 27. In this example, when the edit screen shown in FIG. 26 is displayed on the monitor 16, the user operates the mouse 12 to select a function A formed of the program illustrated in FIG. 28, and further operates the keyboard 13 to input a predetermined variable "mousex" into the input section 105.

Figure 27:
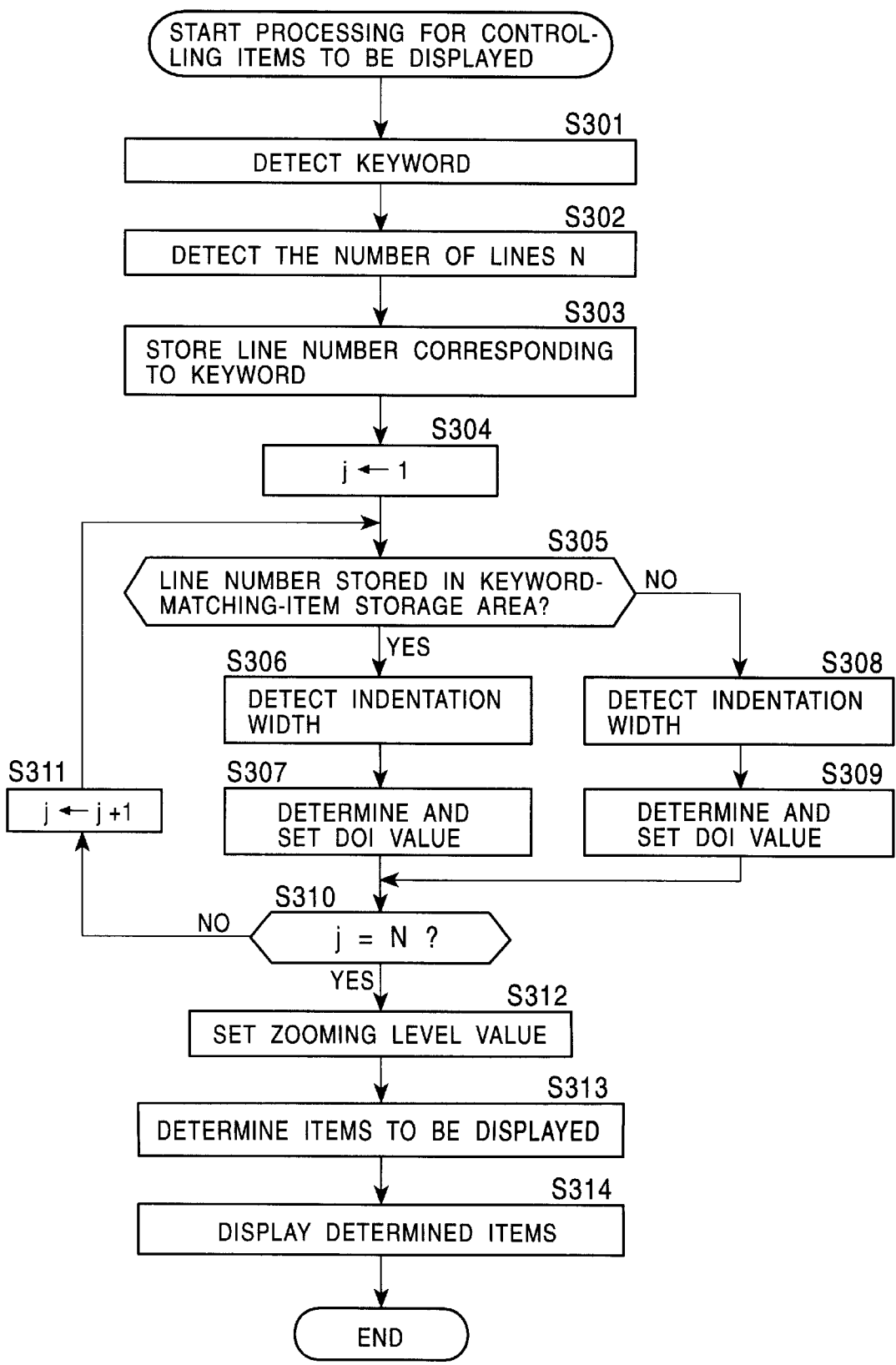
FIG. 27 is a flow chart illustrating the processing for controlling items to be displayed.

Referring to FIG. 27, in step S301, the control unit 10 detects that "mousex" is input into the input section 105. Then, the control unit 10 further detects the number of lines N of the program forming the function A.

Subsequently, in step S303, the control unit 10 detects the line numbers including the variable "mousex" and stores them in the keyword-matching-item storage area 14B. In step S304, the control unit 10 sets 1 (initial value) in a counter j for counting the number of lines, and it is determined in step S305 whether the line number corresponding to the counter j is stored in the keyword-matching-item storage area 14B.

If the result of step S305 is yes, the process proceeds to step S306 in which the control unit 10 detects the indentation width of the line number corresponding to the counter j. In step S307, the control unit then sets the DOI value corresponding to the detected indentation width. In this example, concerning the line numbers stored in the keyword-matching-item storage area 14B, 5 is set in the DOI value for lines having the smallest indentation width, and 1 is set in the DOI value for lines having the greatest indentation width. Generally, in the program structure, a program statement described in the line having a smaller indentation width is considered to be more important. Accordingly, a greater DOI value is set for a line having a smaller indentation width.

If it is found in step S305 that the line number corresponding to the counter j is not stored in the keyword-matching-item storage area 14B, the process proceeds to step S308 in which the control unit 10 detects the indentation width of the line number corresponding to the counter j. Then, in step S309, the control unit 10 sets the DOI value corresponding to the detected indentation width. In this example, concerning the line numbers which are not stored in the keyword-matching-item storage area 14B, 0 is set in the DOI value for lines having the smallest indentation width, and −4 is set in the DOI value for lines having the greatest indentation width.

After setting the DOI value in step S307 or S309, the control unit 10 determines in step S310 whether the counter j is equal to the number of lines N of the program. If the outcome of step S310 is no, the process proceeds to step S311 in which the counter j is incremented by one. The process then returns to step S305, and the DOI value is set for the subsequent line number.

If it is determined in step S310 that the DOI values are set for all the lines, namely, j=N, as shown in FIG. 28, the process proceeds to step S312 in which the control unit 10 sets, for example, 1, in the zooming level value. In step S313, the control unit 10 extracts lines having DOI values greater than 1, and determines them to be items to be displayed.

Figure 29:
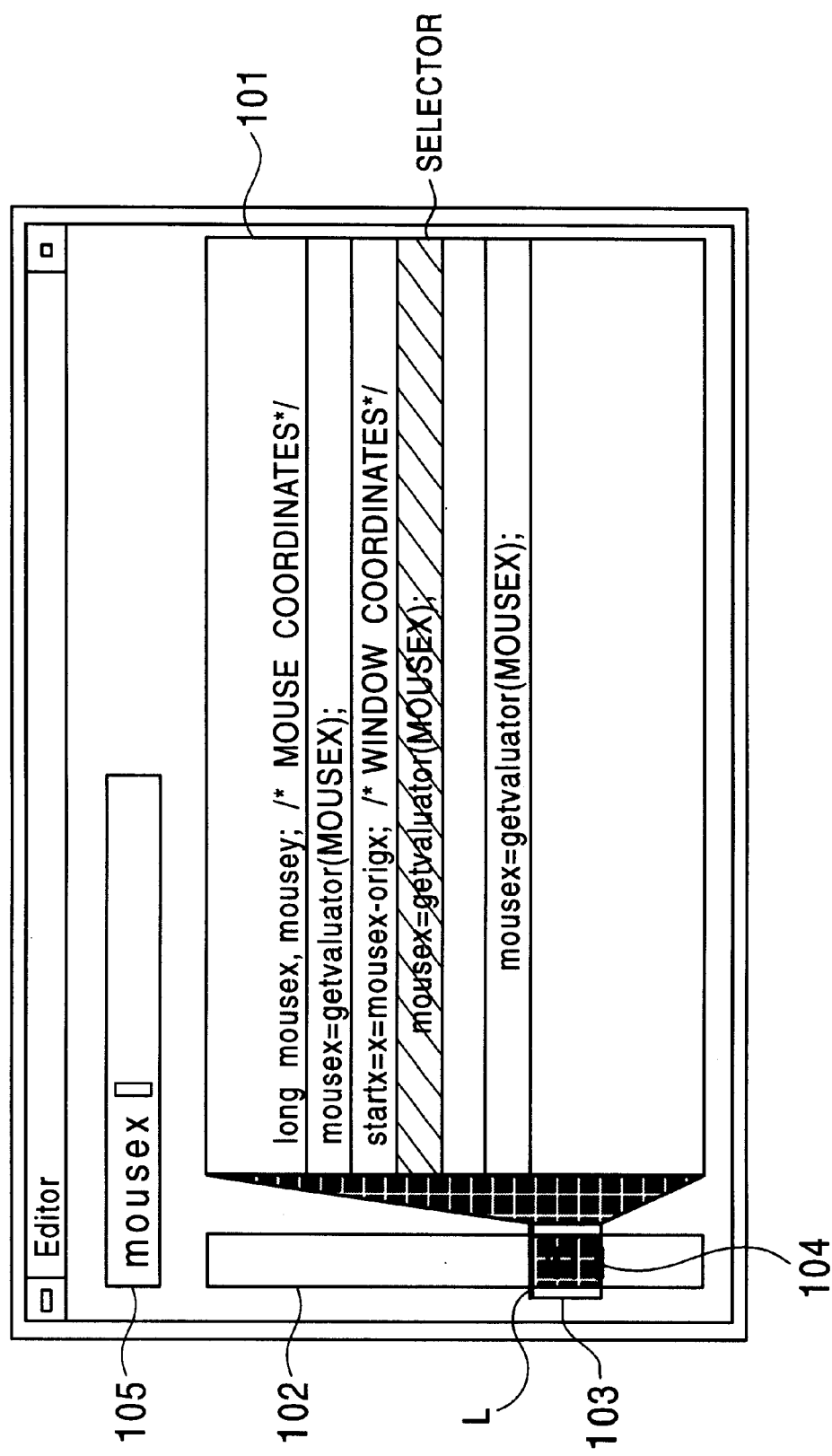
FIG. 29 illustrates another example of the search screen displayed on the display unit 16 shown in FIG. 25.

Thereafter, in step S314, the control unit 10 controls the display controller 15 to display the program statements having the line numbers determined to be displayed in step S313 in the scroll window 101, as illustrated in FIG. 29.

Figure 30:
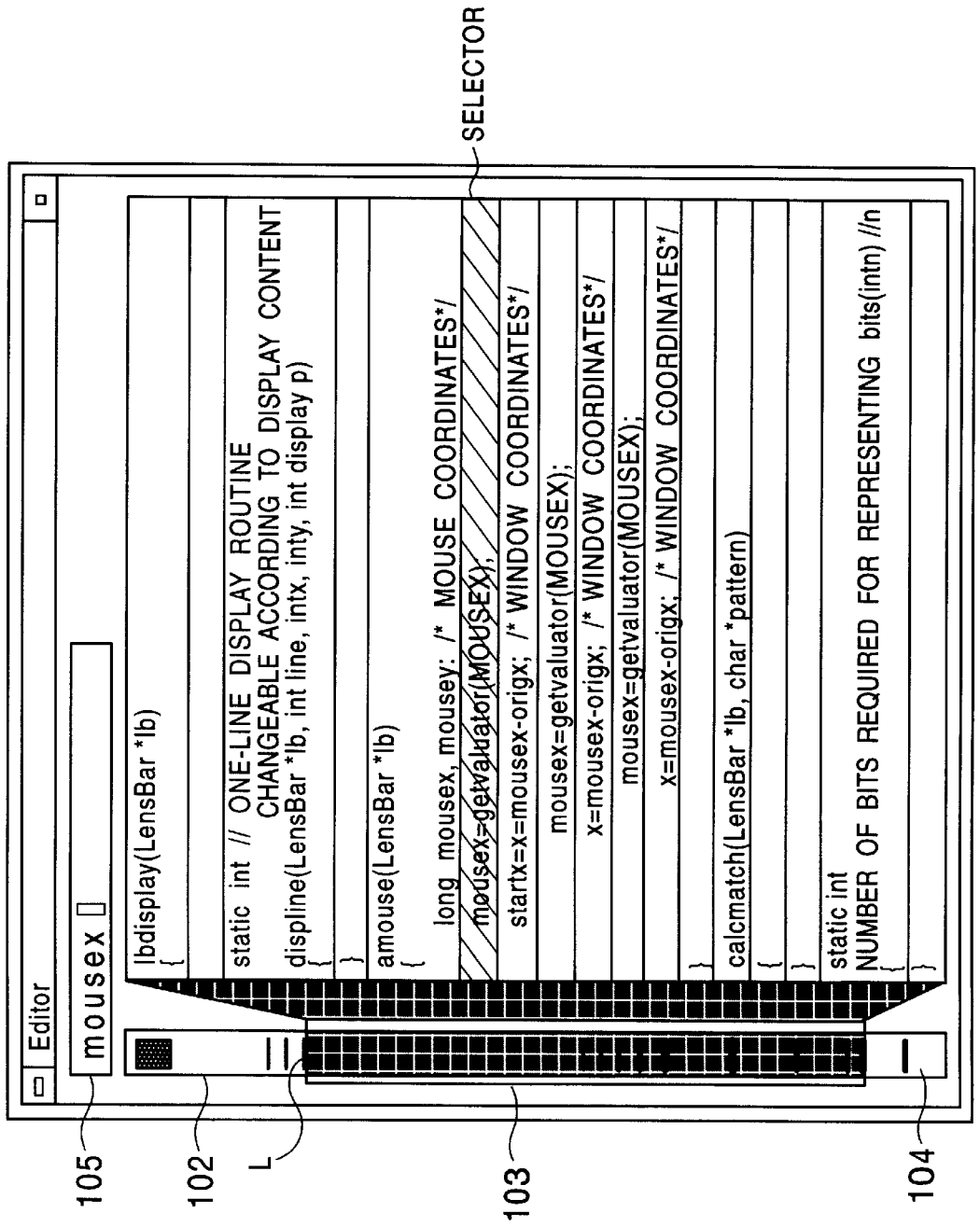
FIG. 30 illustrates still another example of the search screen displayed on the display unit 16 shown in FIG. 25.

According to the foregoing description, only items that match the keyword and are considered to be important are displayed in the scroll window 101. In this example, the program statements having greater DOI values are displayed in the scroll window 101. However, program statements having smaller DOI values may also be displayed, and a program statement having a greater DOI value may be designated by the selector, as shown in FIG. 30, so that the user can be informed that the selected statement is important.

Figure 31:
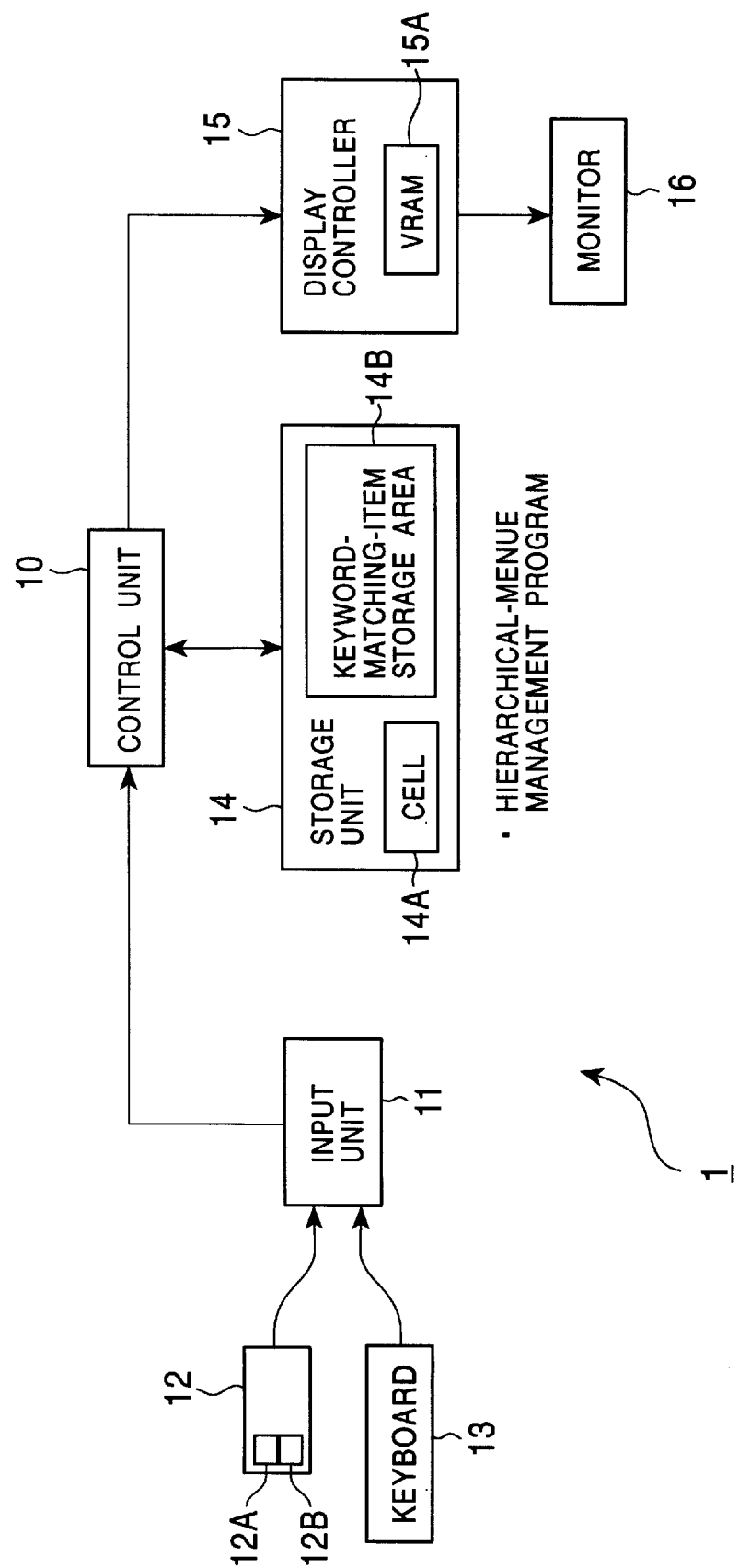
FIG. 31 is a block diagram illustrating the personal computer 1 incorporating a third embodiment of the present invention.

A description is now given of the personal computer 1 incorporating a third embodiment of the present invention with reference to FIG. 31. The same elements as those shown in FIG. 1 are designated by like reference numerals, and an explanation thereof will thus be omitted.

A hierarchical-menu management program provided with a display-item control function is stored in the storage unit 14.

Figure 32:
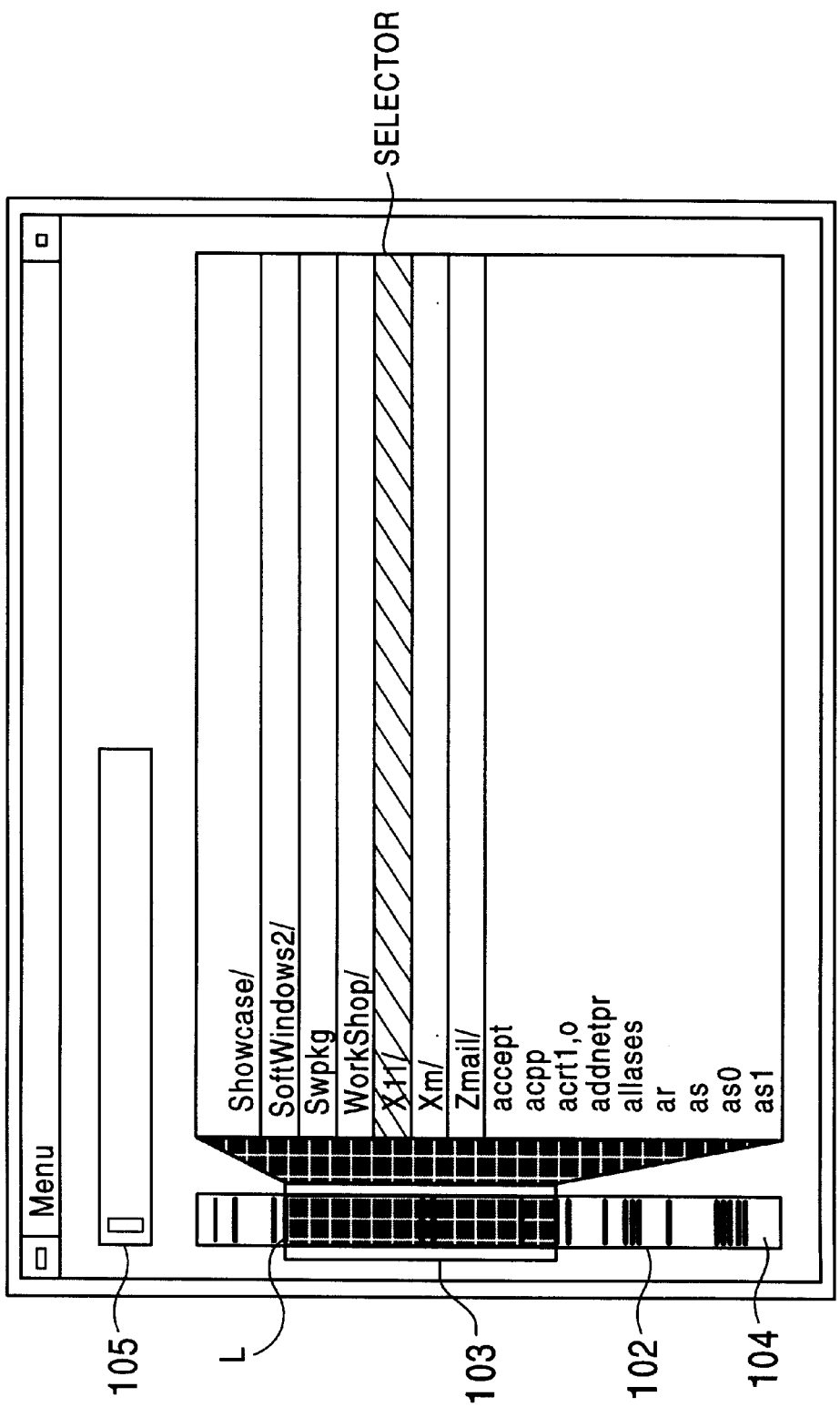
FIG. 32 illustrates an example of a search screen displayed on the display unit 16 shown in FIG. 31.

FIG. 32 illustrates the hierarchical-menu management program which is formed of the scroll window 101, the scroll bar 102, the knob 103, the position-bar indicator 104, and the input section 105, such as those shown in the search screen of FIG. 2. Directories and files located at the highest level of the hierarchical menu and managed by the hierarchical-menu management program are displayed in the scroll window 101.

According to the hierarchical-menu management program, processing similar to that from step S1 to step S6 of FIG. 4 is executed to output the display content of the scroll window 101, and processing similar to that from step S31 to step S43 of FIG. 8 is performed to scroll the display content of the scroll window 101.

Figure 33:
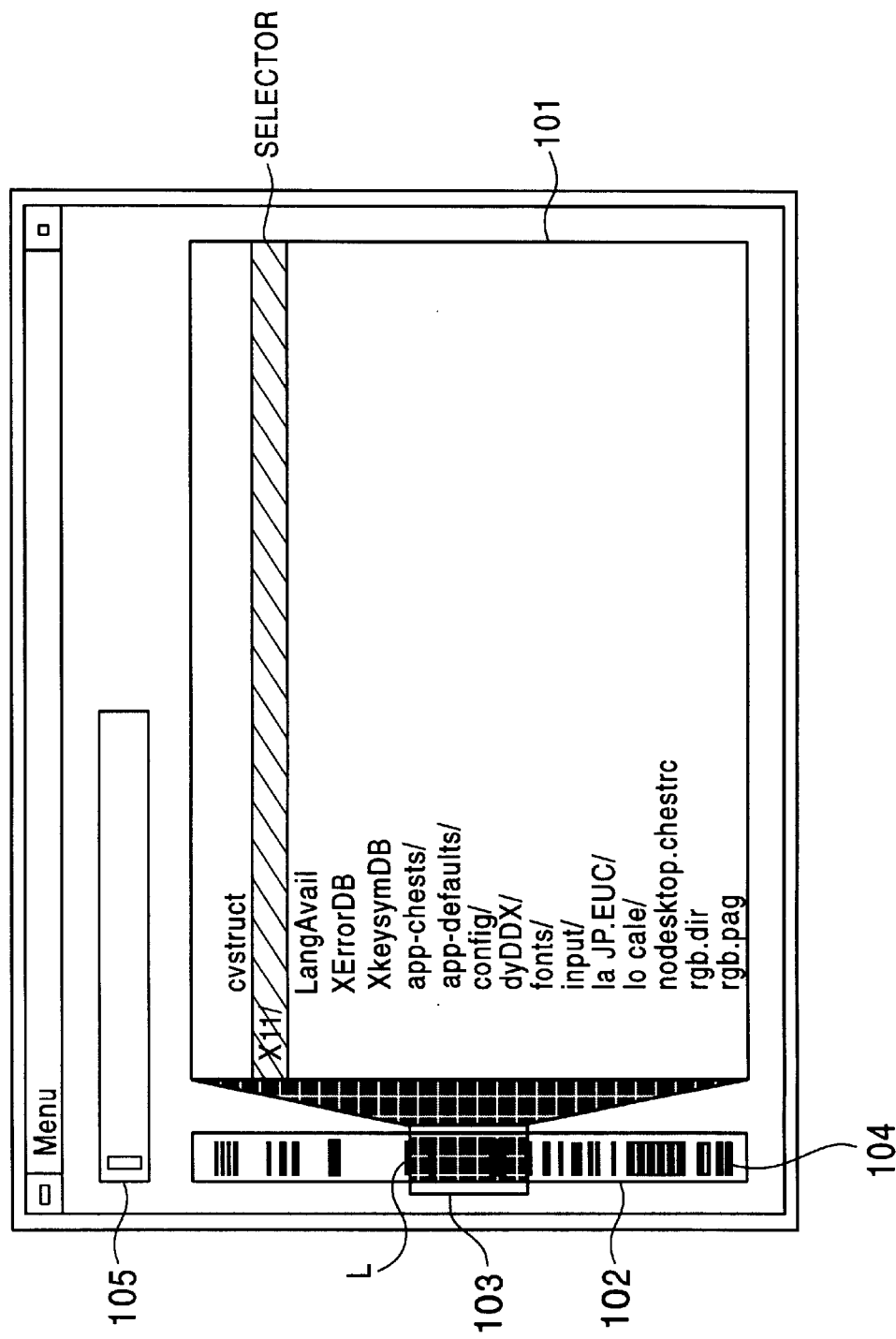
FIG. 33 illustrates another example of the search screen displayed on the display unit 16 shown in FIG. 31.

The processing for controlling items to be displayed is discussed below with reference to FIGS. 33 through 35 together with FIG. 32.

For example, when the management screen shown in FIG. 32 is displayed on the monitor 16, the user operates the mouse 12 to select one of the directories, i.e., "X11", and drags it in the rightward direction. Then, directories and files belonging to "X11" are displayed in the screen window 101, as illustrated in FIG. 33.

Figure 34:
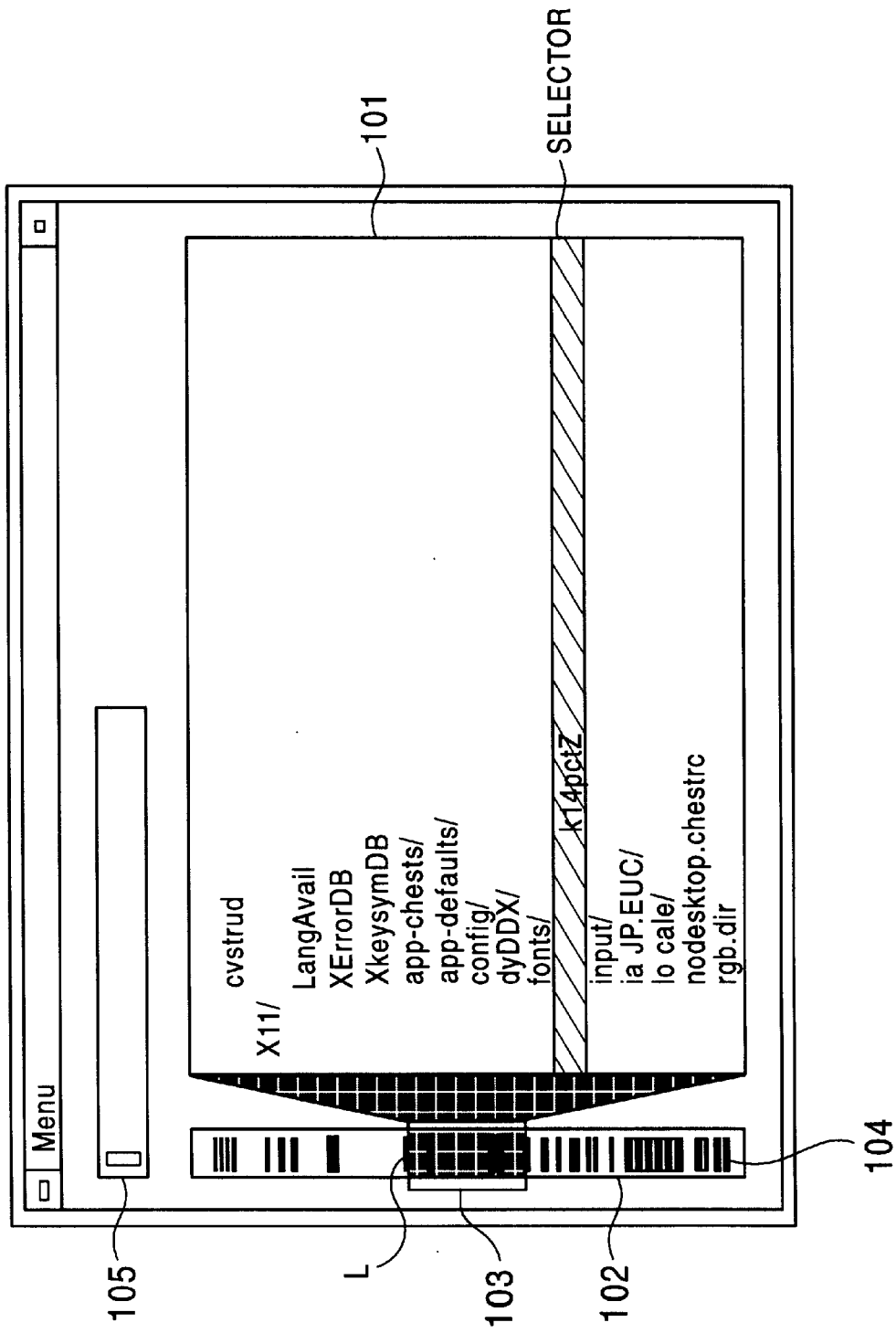
FIG. 34 illustrates still another example of the search screen displayed on the display unit 16 shown in FIG. 31.
Figure 35:
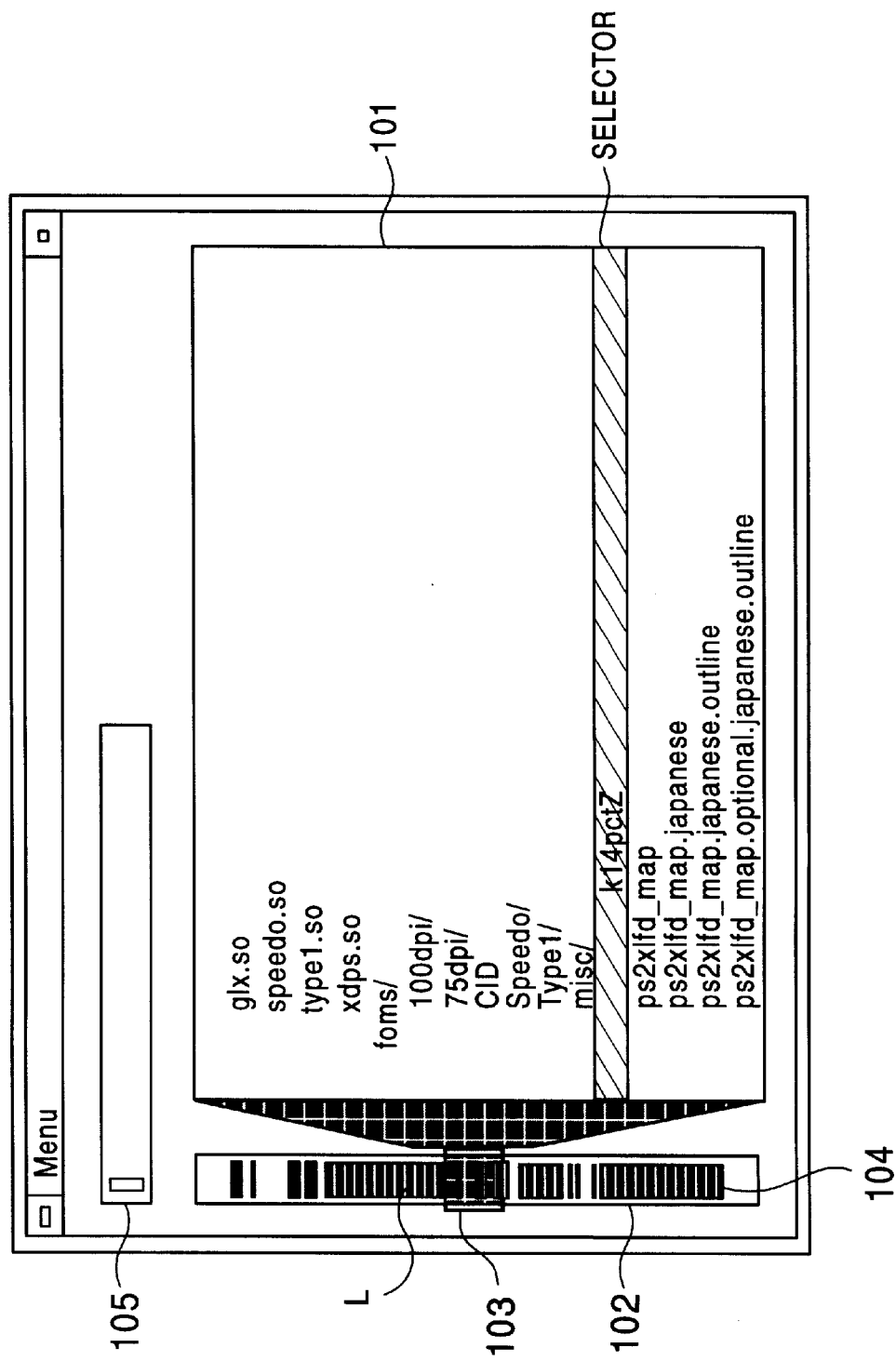
FIG. 35 illustrates a further example of the search screen displayed on the display unit 16 shown in FIG. 31.

Then, the user operates the mouse 12 to select one of the sub-directories, i.e., "fonts", and drags it in the rightward direction by a considerable amount, thereby displaying the file "k14.pcf.Z" belonging to the sub-directory "fonts", as shown in FIG. 34. The user further operates the mouse 12 to select the file "k14.pcf.Z" and drags it in the leftward direction. Then, not only the directory "misc" to which the file "k14.pcf.Z" belongs, but also sub-directories of the directory "fonts", are displayed in the scroll window 101, as illustrated in FIG. 35.

In this manner, the user drags a selected item in the rightward or leftward direction by operating the mouse 12. Thus, only a higher level menu or a lower level menu can be displayed.

Figure 36:
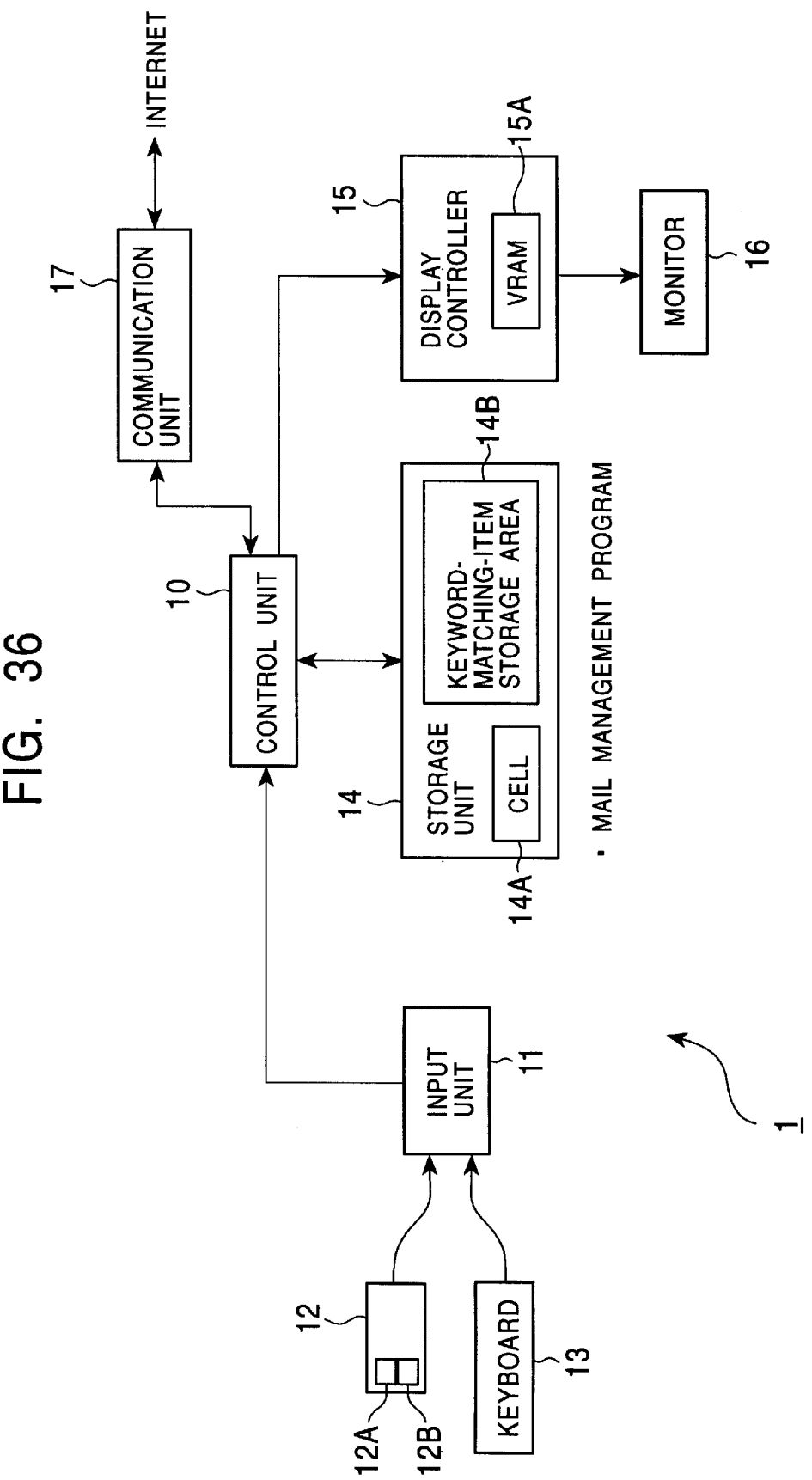
FIG. 36 is a block diagram illustrating the personal computer 1 incorporating a fourth embodiment of the present invention.

The personal computer 1 incorporating a fourth embodiment of the present invention is now described with reference to FIG. 36. The same elements as those shown in FIG. 1 are indicated by like reference numerals, and an explanation thereof will thus be omitted.

A mail management program provided with a display-item control function is stored in the storage unit 14.

A communication unit 17, which is formed of, for example, a modem, is connected to the Internet via a telephone line so as to send and receive mail.

Figure 37:
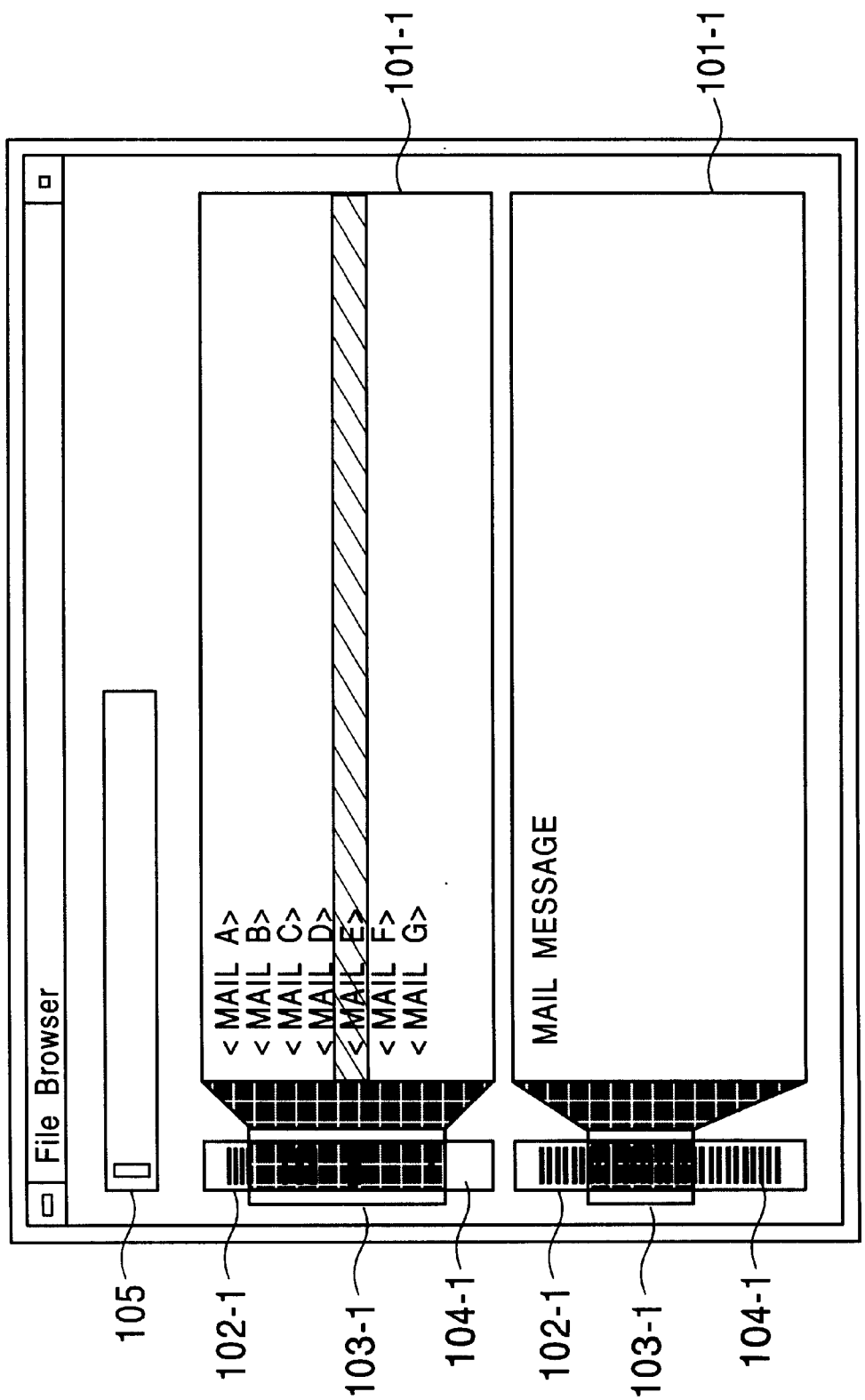
FIG. 37 illustrates an example of a search screen displayed on the display unit 16 shown in FIG. 36.

FIG. 37 illustrates a management screen of the mail management program, which is formed of scroll windows 101-1 and 101-2, scroll bars 102-1 and 102-2, knobs 103-1 and 103-2, position-bar indicators 104-1 and 104-2, and an input section 105. In this case, the subjects of received mail are displayed in the scroll window 101-1, while a mail message selected by the selector is displayed in the scroll window 101-2.

According to the mail management program, processing similar to that from step S1 to step S6 of FIG. 4 is executed to output the display content of the scroll window 101, and processing similar to that from step S31 to step S43 of FIG. 8 is performed to scroll the display content of the scroll window 101.

Further, processing similar to that from step S51 to step S62 of FIG. 9 is executed to control items to be displayed, and processing similar to that from step S101 to step S107 of FIG. 17 is performed to search for words matching the keyword input into the input section 105.

The processing for retrieving words that match the keyword input into the input section 105 is described below with reference to FIG. 38 together with FIG. 37.

It is now assumed that the management screen shown in FIG. 37 is displayed on the monitor 16, and that the user inputs, for example, a keyword A, by operating the keyboard 13. Then, mail containing the keyword A is selected and the corresponding mail subjects are displayed in the scroll window 101-1, as illustrated in FIG. 38. Simultaneously, mail B is selected by the selector so that the message of the mail B is displayed In the scroll window 101-2.

As providing media for providing a computer program executing the above-described processing to the user, not only recording media, such as magnetic disks, compact disc-read only memory (CD-ROM), solid memory, and solid-state memory, but also communication media, such as networks and satellites, may be used.

According to the information processing apparatus, the information processing method, and the providing medium described above, DOI values are set for items in correspondence with the registered numbers, and a predetermined threshold is also set. Then, the items to be displayed are extracted based on the predetermined threshold. It is thus possible to restrict the items to be displayed.

What is claimed is:

1. An information processing apparatus for extracting a predetermined item from a plurality of items having predetermined registered numbers and for displaying the extracted item and selected other items from among said plurality of items, said information processing apparatus comprising:

degree-of-interest-value setting means for setting a degree-of-interest value for each item based on the registered number of the item and the registered number of the predetermined item;

threshold setting means for setting a threshold for the degree-of-interest value of said items to be displayed;

identifying means for identifying items from among said plurality of items having degree-of-interest values of a predetermined relation to said threshold;

first display control means for controlling the predetermined item to be displayed; and second display control means for controlling the other items to be displayed from the items identified by said identifying means.

2. An information processing method for extracting a predetermined item from a plurality of items having predetermined registered numbers and for displaying the extracted item and selected other items from among said plurality of items, said information processing method comprising:

a degree-of-interest-value setting step of setting a degree-of-interest value for each item based on the registered number of the item and the registered number of the predetermined item;

a threshold setting step of setting a threshold for the degree-of-interest value of said items to be displayed;

an identifying step of identifying items from among said plurality of items having degree-of-interest values;

a first display control step of controlling the predetermined item to be displayed; and a second display control step of controlling the other items to be displayed from the items identified in said identifying step.

3. A providing medium for providing a computer-readable program that causes an information processing apparatus for extracting a predetermined item from a plurality of items having predetermined registered numbers and for displaying the extracted item and selected other items from among said plurality of items to execute processing, said processing comprising:

a degree-of-interest-value setting step of setting a degree-of-interest value for each item based on the registered number of the item and the registered number of the predetermined item;

a threshold setting step of setting a threshold for the degree-of-interest value of said items to be displayed;

an identifying step of identifying items from among said plurality of items having degree-of-interest values;

a first display control step of controlling the predetermined item to be displayed; and a second display control step of controlling the other items to be displayed from the items identified in said identifying step.

* * * * *